(12) United States Patent
Iga

(10) Patent No.: US 7,499,082 B2
(45) Date of Patent: Mar. 3, 2009

(54) DISTORTION CORRECTION CIRCUIT FOR GENERATING DISTORTION-CORRECTED IMAGE USING DATA FOR UNCORRECTED IMAGE

(75) Inventor: Kiichiro Iga, Kasugai (JP)

(73) Assignee: Fujitsu Microelectronics Limited, Kawasaki (JP)

( * ) Notice: Subject to any disclaimer, the term of this patent is extended or adjusted under 35 U.S.C. 154(b) by 792 days.

(21) Appl. No.: 10/937,478

(22) Filed: Sep. 10, 2004

(65) Prior Publication Data

US 2005/0174437 A1     Aug. 11, 2005

(30) Foreign Application Priority Data

Feb. 10, 2004   (JP)   ............................. 2004-033783

(51) Int. Cl.
*H04N 5/228* (2006.01)
(52) U.S. Cl. .................. 348/222.1; 348/231.3; 348/241
(58) Field of Classification Search ............. 328/222.1, 328/231.3, 241, 335
See application file for complete search history.

(56) References Cited

U.S. PATENT DOCUMENTS

2003/0223007 A1* 12/2003 Takane ...................... 348/335

2004/0207733 A1* 10/2004 Nose et al. ................ 348/222.1
2006/0110050 A1*  5/2006 Aoyama et al. ............. 382/232

FOREIGN PATENT DOCUMENTS

JP         11-250239         9/1999

\* cited by examiner

*Primary Examiner*—Lin Ye
*Assistant Examiner*—Gevell Selby

(57) ABSTRACT

A circuit for correcting distortion produced by the lens of a digital camera when generating an image, which includes pixels. The correction circuit includes an address generation circuit for generating horizontal and vertical addresses for each pixel. A coefficient storage circuit stores a pitch correction coefficient associated with the horizontal or vertical address of each pixel. A storage circuit stores data for an image for which distortion is uncorrected in association with an address of the uncorrected image. A calculation circuit calculates the address of data of the uncorrected image corresponding to each pixel using the associated horizontal and vertical addresses and pitch correction coefficient of the horizontal or vertical address. A processing circuit reads the data of the uncorrected image from the storage circuit and generates data for a distortion-corrected image.

19 Claims, 16 Drawing Sheets

Fig. 4
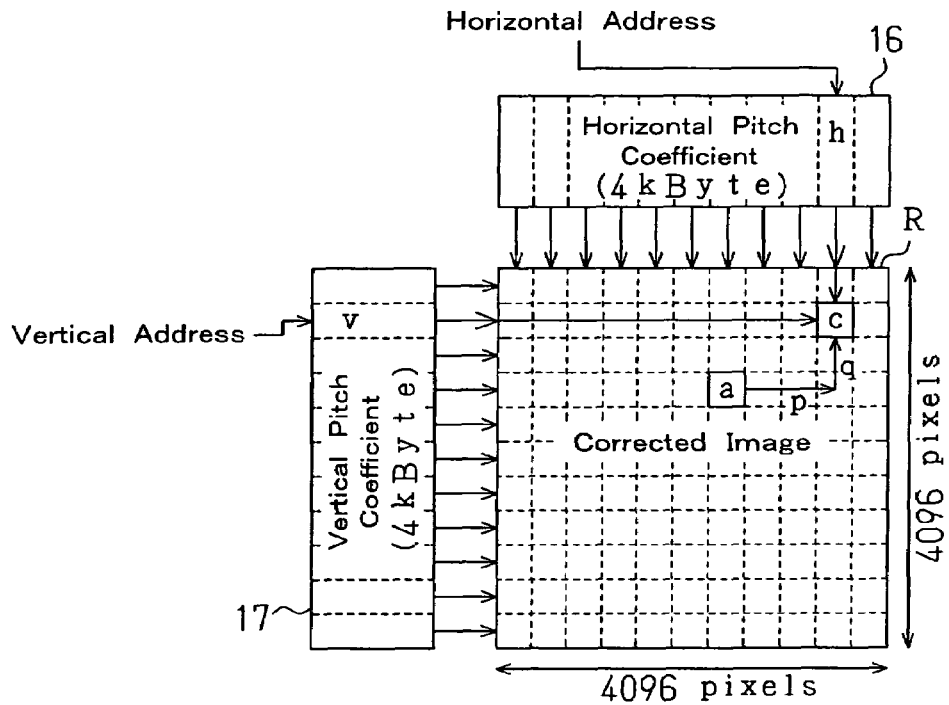
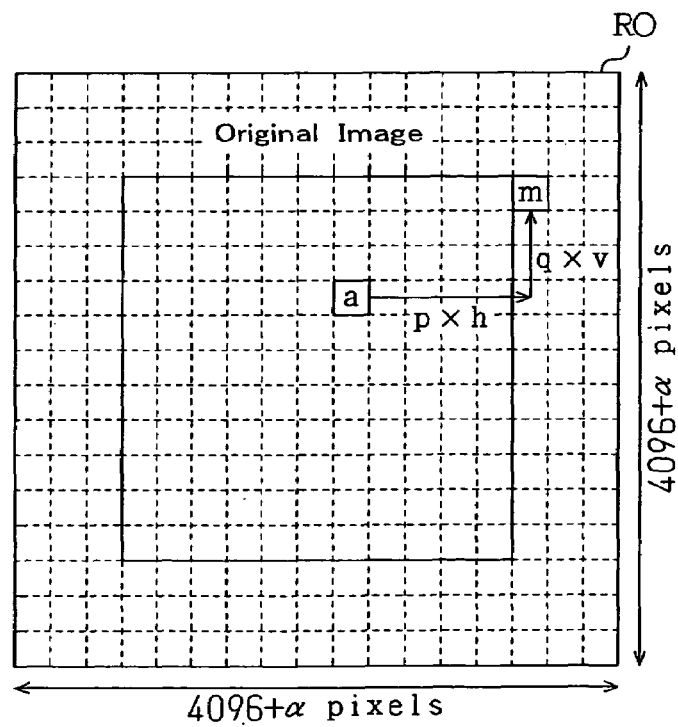

DISTORTION CORRECTION CIRCUIT FOR GENERATING DISTORTION-CORRECTED IMAGE USING DATA FOR UNCORRECTED IMAGE

CROSS-REFERENCES TO RELATED APPLICATIONS

This application is based upon and claims the benefit of priority from prior Japanese Patent Application No. 2004-033783 filed on Feb. 10, 2004, the entire contents of which are incorporated herein by reference.

BACKGROUND OF THE INVENTION

The present invention relates to a distortion correction circuit that retrieves data for an image to correct distortion in the image, and relates to, for example, a distortion correction circuit that corrects an image formed by an imaging device with an optical system having a distortion characteristic.

In recent years, digital cameras, with an increasing number of pixels being recordable, are required to include optical systems having higher performance. For a digital camera using a built-in lens, an exclusively designed lens is used. For a digital camera using changeable lenses, various lenses, each having a unique distortion characteristic, are used. A digital camera incorporated in a mobile telephone typically includes an inexpensive optical system. The distortion characteristic of an inexpensive optical system is usually poor. Thus, there is a demand for techniques that correct the distortion characteristic of an optical system to obtain high-quality images.

For a film camera, a lens designed to minimize distortion of an image is typically used. A digital camera processes image data retrieved in an imaging device via an optical system (lens, focusing mechanism, etc.) and corrects the distortion to obtain an image. Japanese Laid-Open Patent Publication No. 11-250239 describes a correction process executed in a digital camera. In the correction process, the addresses of all the pixels of an image prior to distortion correction are calculated using a coefficient of an approximate polynomial representing an image height—distortion curve, which represents the performance characteristic of a lens. Then, the distortion of the image is corrected using the calculated addresses.

SUMMARY OF THE INVENTION

One aspect of the present invention is a distortion correction circuit for generating a corrected image using data for an uncorrected image. The corrected image is an image for which distortion has been corrected and that includes a plurality of pixels. The distortion correction circuit includes an address generation circuit for generating a horizontal address and a vertical address for each of the plurality of pixels of the corrected image. A correction coefficient storage circuit stores a pixel pitch correction coefficient associated with at least one of the horizontal address and the vertical address of each pixel of the corrected image. A first image storage circuit stores data for the uncorrected image. An address calculation circuit, connected to the address generation circuit, the correction coefficient storage circuit, and the first image storage circuit, calculates an address for data for the uncorrected image corresponding to each pixel using the horizontal address and the vertical address of each pixel and the pixel pitch correction coefficient associated with at least one of the horizontal address and the vertical address of each pixel. A data processing circuit, connected to the first image storage circuit, reads the data for the uncorrected image stored at the address calculated by the address calculation circuit from the first image storage circuit and generates image data for the corrected image. A second image storage circuit, connected to the data processing circuit, stores the image data for the corrected image.

A further aspect of the present invention is a distortion correction circuit for an imaging device including an optical system with a distortion characteristic. The distortion correction circuit processes data for an uncorrected image formed by the optical system to generate a corrected image for which distortion has been corrected. The uncorrected image includes a plurality of first pixels that form a plurality of lines and a plurality of columns, and the corrected image includes a plurality of second pixels that form a plurality of lines and a plurality of columns. The distortion correction circuit includes an address generation circuit for generating a line address and a column address for each of the plurality of second pixels. A correction coefficient storage circuit stores a pixel pitch correction coefficient that is predetermined in accordance with the distortion characteristic in association with at least one of the line address and the column address for each second pixel. A first image storage circuit stores data for the uncorrected image in association with a line address and a column address for each of the plurality of first pixels. An address calculation circuit, connected to the address generation circuit, the correction coefficient storage circuit, and the first image storage circuit, calculates a line address and a column address for a first pixel corresponding to each second pixel using the line address and the column address of the second pixel and the pixel pitch correction coefficient associated with the second pixel. A data processing circuit, connected to the first image storage circuit, generates image data for the corrected image by referring to data for each first pixel specified by the calculated line address and the column address of the first pixel. A second image storage circuit, connected to the data processing circuit, stores the image data for the corrected image.

BRIEF DESCRIPTION OF THE DRAWINGS

The invention, together with objects and advantages thereof, may best be understood by reference to the following description of the presently preferred embodiments together with the accompanying drawings in which:

FIG. 4 is a diagram illustrating the correction performed in the third embodiment;

DETAILED DESCRIPTION OF THE PREFERRED EMBODIMENTS

The correction process described in the above prior art publication calculates the addresses of all the pixels in an image using an approximate polynomial. The calculation imposes a high load, and makes it difficult to realize high-speed operation of a distortion correction circuit.

Figure 1:
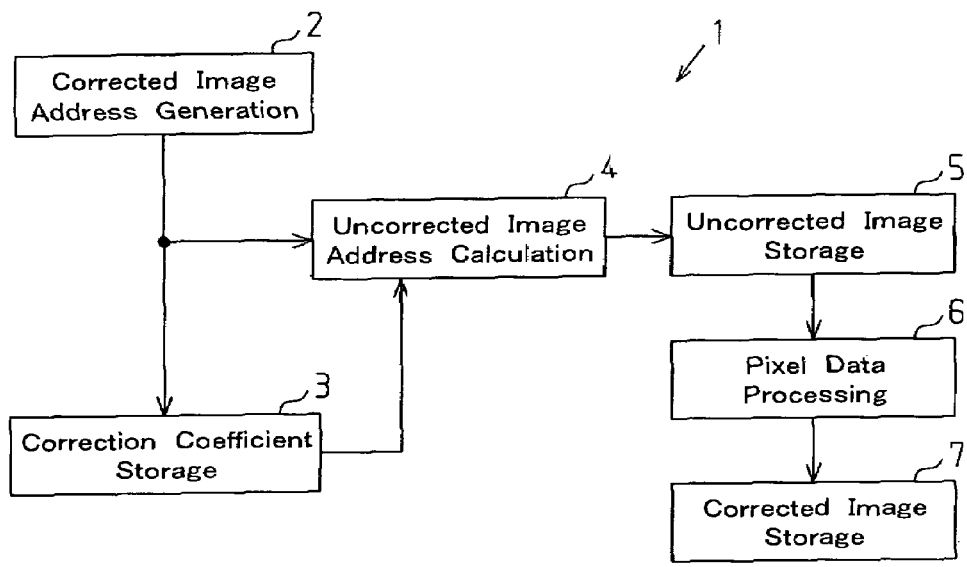
FIG. 1 is a block diagram of a distortion correction circuit according to a first embodiment of the present invention.

As shown in FIG. 1, a distortion correction circuit 1 according to a first embodiment of the present invention includes a corrected image address generation circuit 2, a correction coefficient storage circuit 3, an uncorrected image address calculation circuit 4, an uncorrected image storage circuit 5, a pixel data processing circuit 6, and a corrected image storage circuit 7. In the distortion correction circuit 1, the corrected image address generation circuit 2 generates a horizontal address and a vertical address for each pixel of a corrected image. The uncorrected image address calculation circuit 4 reads a pixel pitch correction coefficient, which is associated with the horizontal and vertical addresses generated by the corrected image address generation circuit 2, from the correction coefficient storage circuit 3. The uncorrected image address calculation circuit 4 calculates the data addresses of an uncorrected image using the horizontal and vertical addresses and the pixel pitch correction coefficient associated with the horizontal and vertical addresses. The uncorrected image storage circuit 5 stores the data for the uncorrected image. The pixel data processing circuit 6 reads image data corresponding to a pixel specified by the horizontal and vertical addresses from the uncorrected image storage circuit 5. Then, the pixel data processing circuit 6 executes processing for generating corrected image data (specifically, processing for resolution conversion) and stores the corrected image data in the corrected image storage circuit 7. In this way, the distortion correction circuit 1 eliminates the need for complex calculation using a polynomial as in the prior art. Thus, the distortion correction circuit 1 enables high-speed distortion correction.

The correction coefficient storage circuit 3 includes a first coefficient memory for storing a horizontal pitch coefficient of a pixel that is to be corrected (correction pixel), which is associated with a horizontal address, and a second coefficient memory for storing a vertical pitch coefficient of a correction pixel, which is associated with a vertical address. The uncorrected image address calculation circuit 4 calculates a horizontal address for uncorrected image data based on a horizontal address and a horizontal pitch coefficient associated with the horizontal address, and calculates a vertical address for the uncorrected image data based on a vertical address and a vertical pitch coefficient associated with the vertical address.

The first coefficient memory stores two horizontal pitch coefficients corresponding to horizontally symmetric distortion. The second coefficient memory stores two vertical pitch coefficients corresponding to vertically symmetric distortion. A switch circuit selects one of the two pitch coefficients stored in each coefficient memory. The selected horizontal and vertical pitch coefficients are used to calculate an address for uncorrected image data. In this way, the pitch coefficient is selected by the switch circuit. When, for example, the lens is changed, this structure enables the distortion correction to be quickly adjusted in accordance with the distortion characteristic of the newly attached lens. Further, the same horizontal pitch coefficient is used for two pixels positioned horizontally symmetric to each other, and the same vertical pitch coefficient is used for two pixels positioned vertically symmetric to each other. Thus, the storage capacity required for each coefficient memory is small compared with when one pitch coefficient is individually stored for each pixel.

Figure 2:
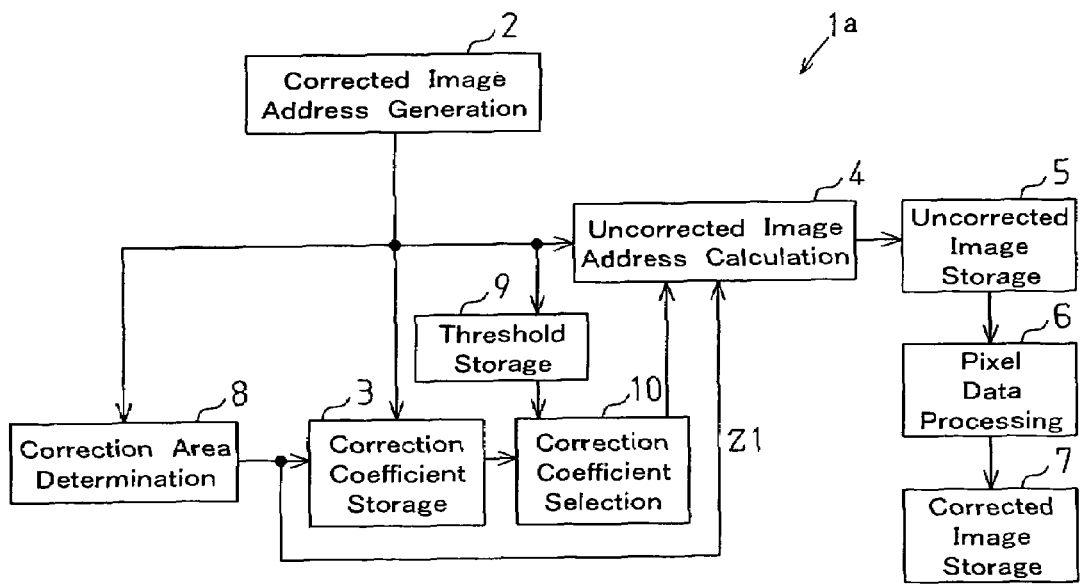
FIG. 2 is a block diagram of a distortion correction circuit according to a second embodiment of the present invention.

As shown in FIG. 2, a distortion correction circuit 1a according to a second embodiment of the present invention includes a corrected image address generation circuit 2, a correction coefficient storage circuit 3, an uncorrected image address calculation circuit 4, an uncorrected image storage circuit 5, a pixel data processing circuit 6, a corrected image storage circuit 7, and a correction area determination circuit 8. The correction area determination circuit 8 determines whether the horizontal and vertical addresses generated by the corrected image address generation circuit 2 are in an area that requires correction or in an area that requires no correction. When these addresses are in an area that requires no correction, the correction area determination circuit 8 outputs a no-correction signal Z1. When receiving the no-correction signal Z1, the uncorrected image address calculation circuit 4 uses the horizontal and vertical addresses generated by the corrected image address generation circuit 2 as addresses of non-corrected image data. This structure eliminates the need to prepare and store pitch coefficients for an image area that requires no correction (area without distortion) and accordingly reduces the storage capacity of the correction coefficient storage circuit 3.

The distortion correction circuit 1a further includes a threshold storage circuit 9 and a correction coefficient selection circuit 10. The threshold storage circuit 9 stores an offset value of a pixel pitch correction coefficient that is associated with an address generated by the corrected image address generation circuit 2. The correction coefficient selection circuit 10 determines whether to use a pixel pitch correction coefficient stored in the correction coefficient storage circuit 3 based on an offset value of the pixel pitch correction coefficient.

According to the first and second embodiments, the calculation for distortion correction is simple, and the distortion correction circuit performs distortion correction at high-speed.

The following describes a distortion correction circuit according to a third embodiment of the present invention.

Figure 3:
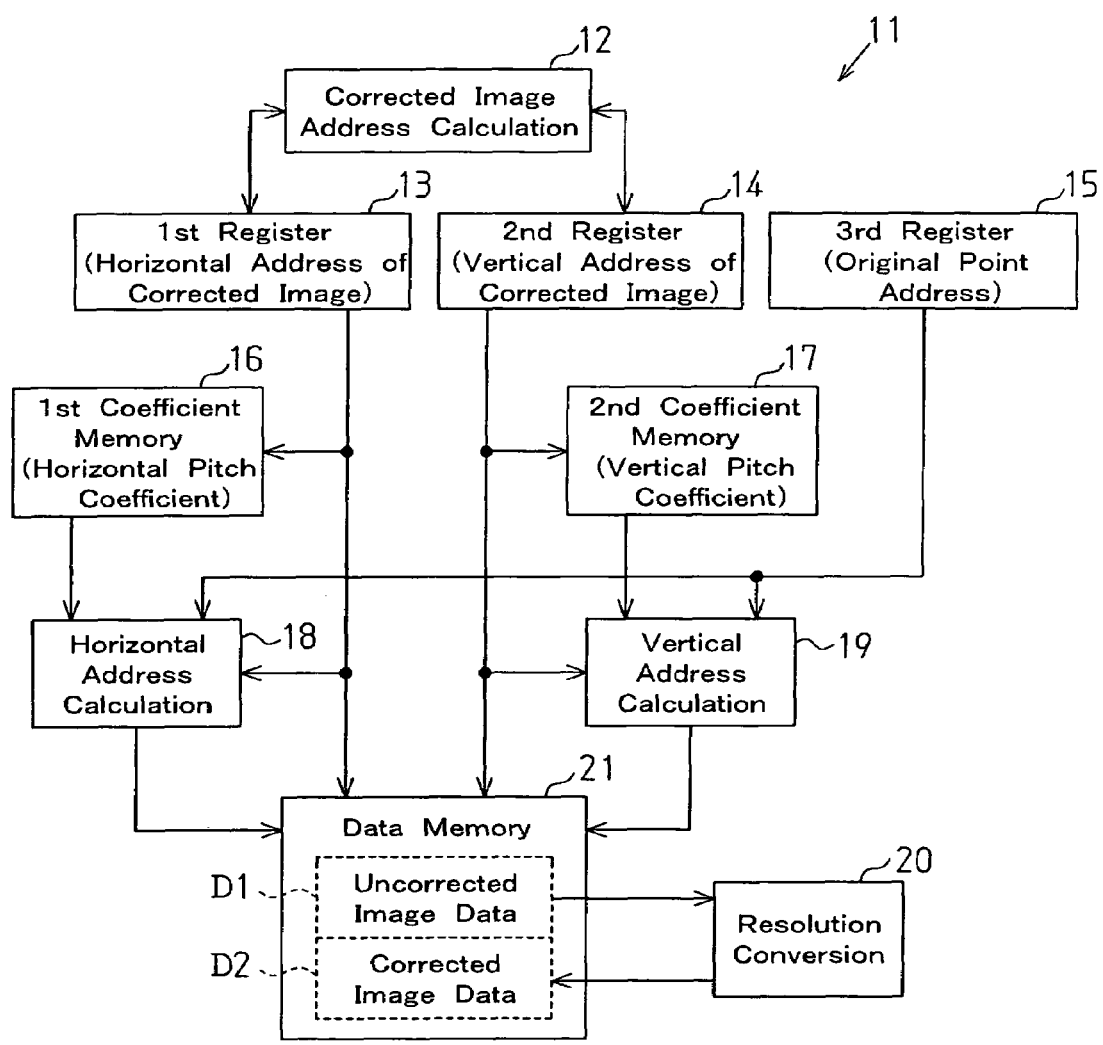
FIG. 3 is a block diagram of a distortion correction circuit according to a third embodiment of the present invention.

As shown in FIG. 3, a distortion correction circuit 11 according to the third embodiment is used for a digital camera, and processes data for an uncorrected image formed by an imaging device (e.g., a CCD sensor and a CMOS sensor) of the digital camera, to generate a corrected image whose distortion has been corrected. The corrected image generated by the distortion correction circuit 11 is, for example, a square image with a size of 4096×4096 pixels. To generate the corrected image, the distortion correction circuit 11 searches an uncorrected image (original image) for image data for a horizontal address and a vertical address of each pixel of the corrected image. The original image is larger than the corrected image. The original image is, for example, an image with the size of (4096+α)×(4096+α) pixels including pincushion distortion as shown in FIG. 4.

As shown in FIG. 3, the distortion correction circuit 11 includes a corrected image address calculation circuit 12, first to third registers 13 to 15, first and second coefficient memories 16 and 17, a horizontal address calculation circuit 18, a vertical address calculation circuit 19, a resolution conversion circuit 20, and a data memory 21. The data memory 21 has a first storage area D1 storing data for the uncorrected image retrieved by the imaging device. The data memory 21 has a second storage area D2 in which data for the corrected image whose distortion has been corrected is stored.

The corrected image address calculation circuit 12 generates a horizontal address and a vertical address of the corrected image and stores the horizontal address and the vertical address in the first register 13 and the second register 14, respectively. At the start of distortion correction, the corrected image address calculation circuit 12 clears the addresses stored in the first and second registers to zero, and performs correction on one pixel after another from the pixel whose horizontal address is "0" and vertical address is "0" (specifically, the leftmost pixel on the uppermost line in an image area R of the corrected image shown in FIG. 4). Every time when completing correction of one pixel, the corrected image address calculation circuit 12 increments the address stored in the first register 13 by one. When completing correction of the final pixel (the rightmost pixel in FIG. 4) on each horizontal line, the corrected image address calculation circuit 12 clears the horizontal address to zero, and increments the vertical address stored in the second register 14 by one.

The third register 15 stores an original point address, which functions as a reference point for distortion correction. The first coefficient memory 16 stores a plurality of horizontal pitch coefficients h, each associated with one of the horizontal addresses of a plurality of pixels constituting each line of an image. The second coefficient memory 17 stores a plurality of vertical pitch coefficients, each associated with one of the vertical addresses of a plurality of pixels constituting each column of the image. As one example, each horizontal pitch coefficient and each vertical pitch coefficient may be data of one byte, and each of the coefficient memories 16 and 17 may have a storage capacity of 4096 bytes. Each horizontal pitch coefficient and each vertical pitch coefficient are used to shift the address (position) of a pixel according to distortion in the image caused by the distortion characteristic of the optical system.

The horizontal address calculation circuit 18 reads a horizontal pitch coefficient, which is associated with each horizontal address stored in the first register 13, from the first coefficient memory 16. Also, the horizontal address calculation circuit 18 reads the horizontal address stored in the first register 13 and the original point address stored in the third register 15. The horizontal address calculation circuit 18 then calculates a horizontal address for uncorrected image data based on the read horizontal pitch coefficient, the original point address, and the horizontal address, and provides the data memory 21 with the calculated horizontal address.

The vertical address calculation circuit 19 reads a vertical pitch coefficient, which is associated with each vertical address stored in the second register 14, from the second coefficient memory 17. Also, the vertical address calculation circuit 19 reads the vertical address stored in the second register 14 and the original point address stored in the third register 15. The vertical address calculation circuit 19 then calculates a vertical address for the uncorrected image data based on the read vertical pitch coefficient, the original point address, and the vertical address, and provides the data memory 21 with the calculated vertical address.

The resolution conversion circuit 20 reads image data for the uncorrected image corresponding to horizontal addresses and vertical addresses calculated by the horizontal address calculation circuit 18 and the vertical address calculation circuit 19, and image data of the uncorrected image corresponding to several pixels around an outer portion of the uncorrected image. The resolution conversion circuit 20 performs resolution conversion according to the corrected image using the read image data, and provides the data memory 21 with corrected image data resulting from the resolution conversion. As one example, the resolution conversion circuit 20 may execute processing complying with a well-known conversion method called "nearest neighbor".

The horizontal address for the corrected image stored in the first register 13 and the vertical address of the corrected image stored in the second register 14 are input to the data memory 21 as write addresses. The corrected image data from the resolution conversion circuit 20 is stored in a storage area specified by the horizontal address and the vertical address of the corrected image.

The correction process executed by the distortion correction circuit 11 will now be described with reference to FIG. 4.

The first coefficient memory 16 stores horizontal pitch coefficients, each of which is set for one of the 4096 pixels arranged horizontally in the image area R of the corrected image. The second coefficient memory 17 stores vertical pitch coefficients, each of which is set for one of the 4096 pixels arranged in the vertical direction.

For each pixel that is to be corrected (correction pixel), a horizontal pitch coefficient h specified by the horizontal address stored in the first register 13 and a vertical pitch coefficient v specified by the vertical address stored in the second register 14 are read. For example, a pixel at position c (coordinate (p, q)) in the corrected image corresponds to a pixel at the reference position m in the original image. The horizontal distance between the original point a and the reference position m is obtained from p×h, and the vertical distance between the original point a and the reference position m is obtained from q×v. The coordinate (p, q) is calculated using the horizontal address stored in the first register 13, the vertical address stored in the second register 14, and the original point address stored in the third register 15. Image data for the pixel at position c of the corrected image is obtained by referring to image data for the pixel at the reference position m of the uncorrected image.

Each of the pitch coefficients h and v is expressed in a fixed-point format such as "xxx.xxxx". Thus, the value of the reference position m may be a decimal. A pixel corresponding to the reference position m whose value is a decimal does not exist in the original image. In this case, an interpolation operation for resolution conversion is performed using image data corresponding to several pixels neighboring the reference position m. With this interpolation operation, image data for the corrected image corresponding to the reference position m is obtained.

The third embodiment has the advantages described below.

(1) A horizontal pitch coefficient associated with a horizontal address for a corrected pixel is read from the first coefficient memory 16. A vertical pitch coefficient associated with a vertical address of the corrected pixel is read from the second coefficient memory 17. The reference position m of the original image is calculated using the read pitch coefficients. This enables high-speed and simple distortion correction since an approximate polynomial is not used like in the prior art to calculate the addresses of pixels.

(2) In the third embodiment, horizontal and vertical pitch coefficients are used. This enables distortion correction to be properly performed both in the horizontal direction and in the vertical direction.

(3) The third register 15 stores the address of the original point a. This enables distortion of an image distorted at the original point a to be precisely corrected. This also enables an image distorted at a desired position to be easily formed by changing the address of the original point to a desired value.

Fourth to sixth embodiments of the present invention will now be described focusing on differences from the third embodiment. In the description of the fourth to sixth embodiments, the components equivalent to those in the third embodiment are given the same reference numerals as in the third embodiment. Such components will not be described in detail.

Figure 5:
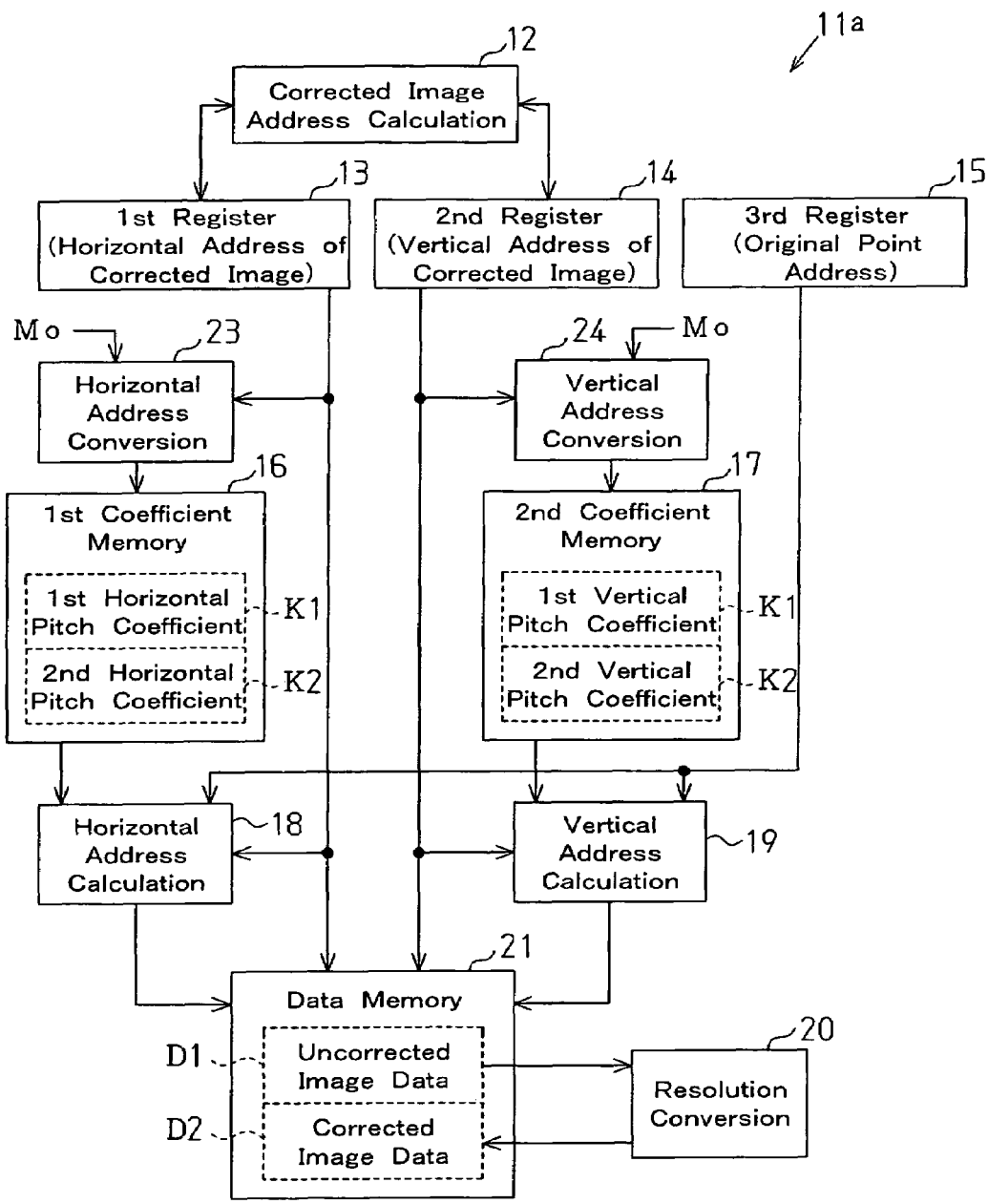
FIG. 5 is a block diagram of a distortion correction circuit according to a fourth embodiment of the present invention.
Figure 6:
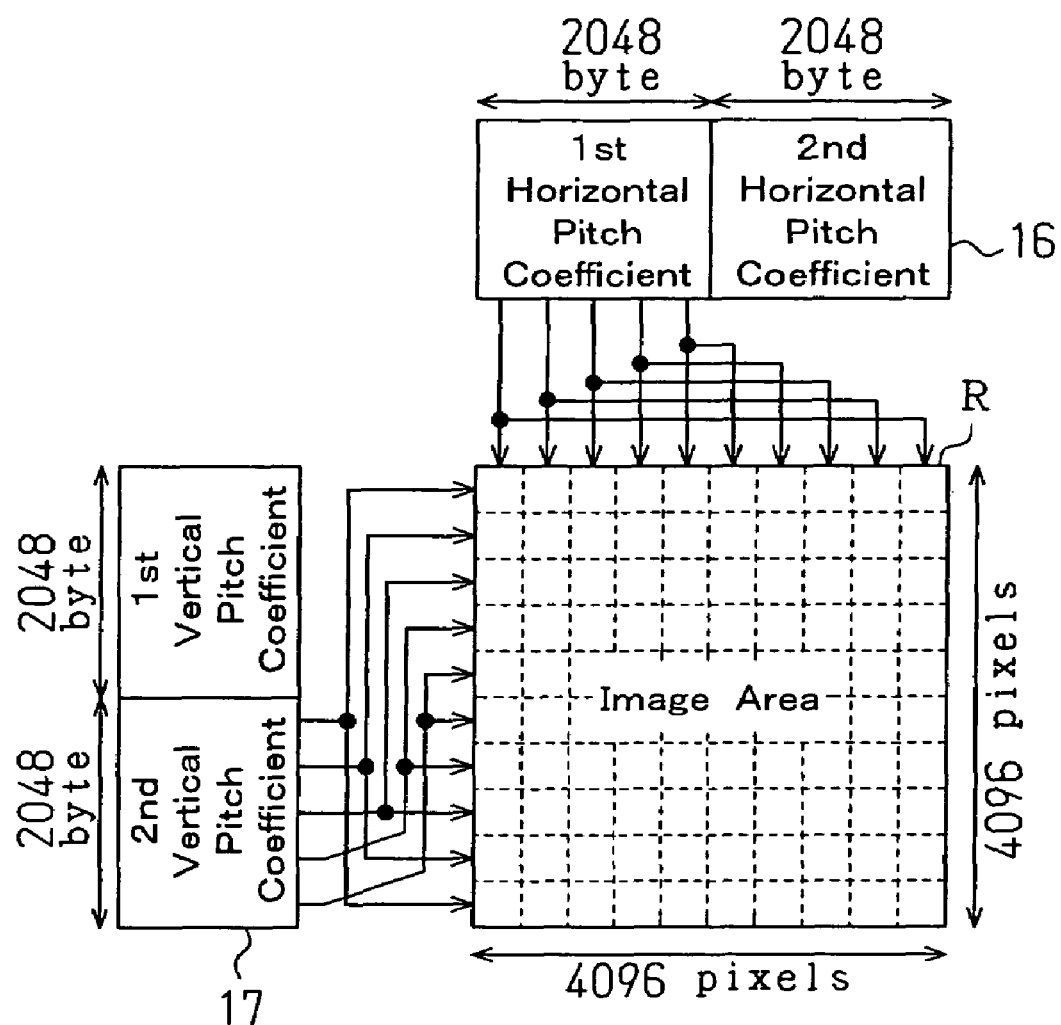
FIG. 6 is a diagram illustrating the correction performed in the fourth embodiment.

FIG. 5 shows a distortion correction circuit 11a according to a fourth embodiment. FIG. 6 is a diagram describing a correction process executed by the distortion correction circuit 11a.

As shown in FIG. 5, the distortion correction circuit 11a includes, in addition to the components shown in FIG. 3, a horizontal address conversion circuit 23 and a vertical address conversion circuit 24. Each of the first and second coefficient memories 16 and 17 is divided into a first storage area K1 with 2048 bytes and a second storage area K2 with 2048 bytes. A first horizontal pitch coefficient and a second horizontal pitch coefficient are respectively stored in the first storage area K1 and the second storage area K2 of the first coefficient memory 16. A first vertical pitch coefficient and a second vertical pitch coefficient are respectively stored into the first storage area K1 and the second storage area K2 of the second coefficient memory 17. One of the two horizontal pitch coefficients stored in the first coefficient memory 16 is selected, for example, according to the distortion characteristic of the optical system. One of the two vertical pitch coefficients stored in the second coefficient memory 17 is selected according to the distortion characteristic of the optical system.

The distortion correction circuit 11a uses the first horizontal pitch coefficient or the second horizontal pitch coefficient stored in the first coefficient memory 16 to correct horizontally symmetric distortion in an image. Also, the distortion correction circuit 11a uses the first vertical pitch coefficient or the second vertical pitch coefficient stored in the second coefficient memory 17 to correct vertically symmetric distortion in the image.

In more detail, the horizontal address conversion circuit 23 converts the horizontal address stored in the first register 13 according to a conversion mode set by a mode selection signal Mo, which is provided from an external circuit. The vertical address conversion circuit 24 converts the vertical address stored in the second register 14 according to a conversion mode set by a mode selection signal Mo. Conversion modes selectively used by the horizontal address conversion circuit 23 include a first mode for converting the horizontal address into an address for reading the first horizontal pitch coefficient from the first coefficient memory 16 and a second mode for converting the horizontal address into an address for reading the second horizontal pitch coefficient from the first coefficient memory 16. Conversion modes selectively used by the vertical address conversion circuit 24 include a first mode for converting the vertical address into an address for reading the first vertical pitch coefficient and a second mode for converting the vertical address into an address for reading the second vertical pitch coefficient.

When, for example, the conversion mode used by the horizontal address conversion circuit 23 is the first mode and the conversion mode used by the vertical address conversion circuit 24 is the second mode, the horizontal address calculation circuit 18 reads the first horizontal pitch coefficient from the first coefficient memory 16 and reads the second vertical pitch coefficient from the second coefficient memory 17 as shown in FIG. 6. Then, the horizontal address calculation circuit 18 uses the first horizontal pitch coefficient to calculate a horizontal address for the uncorrected image, and provides the data memory 21 with the calculated horizontal address. The vertical address calculation circuit 19 uses the second vertical pitch coefficient to calculate a vertical address for the uncorrected image and provides the data memory 21 with the calculated vertical address.

When a horizontal address and a vertical address for the uncorrected image are calculated, the same first horizontal pitch coefficient is used for pixels positioned horizontally symmetric to each other in the image area R of the corrected image, and the same second vertical pitch coefficient is used for pixels positioned vertically symmetric to each other in the image area R. In the fourth embodiment, therefore, distortion correction is performed on 4096×4096 pixels of the corrected image both in a horizontally symmetric manner and in a vertically symmetric manner.

The fourth embodiment has the advantages described below.

(1) The first coefficient memory 16 stores two horizontal pitch coefficients corresponding to horizontally symmetric distortion, and the second coefficient memory 17 stores two vertical pitch coefficients corresponding to vertically symmetric distortion. The horizontal address conversion circuit 23 converts the horizontal address stored in the first register 13 according to the mode selection signal Mo provided from an external circuit to selectively read one horizontal pitch coefficient in accordance with the converted address. Further, the vertical address conversion circuit 24 converts the vertical address stored in the second register 14 according to the mode selection address Mo to selectively read one vertical pitch coefficient in accordance with the converted address. This structure enables each of the horizontal and vertical pitch coefficients to be switched according to the mode selection signal Mo and enables distortion correction to be quickly changed when the lens of the digital camera is changed.

(2) The same first horizontal pitch coefficient is used for pixels positioned horizontally symmetric to each other in the image area R, and the same second vertical pitch coefficient is used for pixels positioned vertically symmetric to each other in the image area R. This structure reduces the storage capacity for storing pitch coefficients by one half compared with when one horizontal pitch coefficient is stored for each of the 4096 pixels arranged in the horizontal direction.

Figure 7:
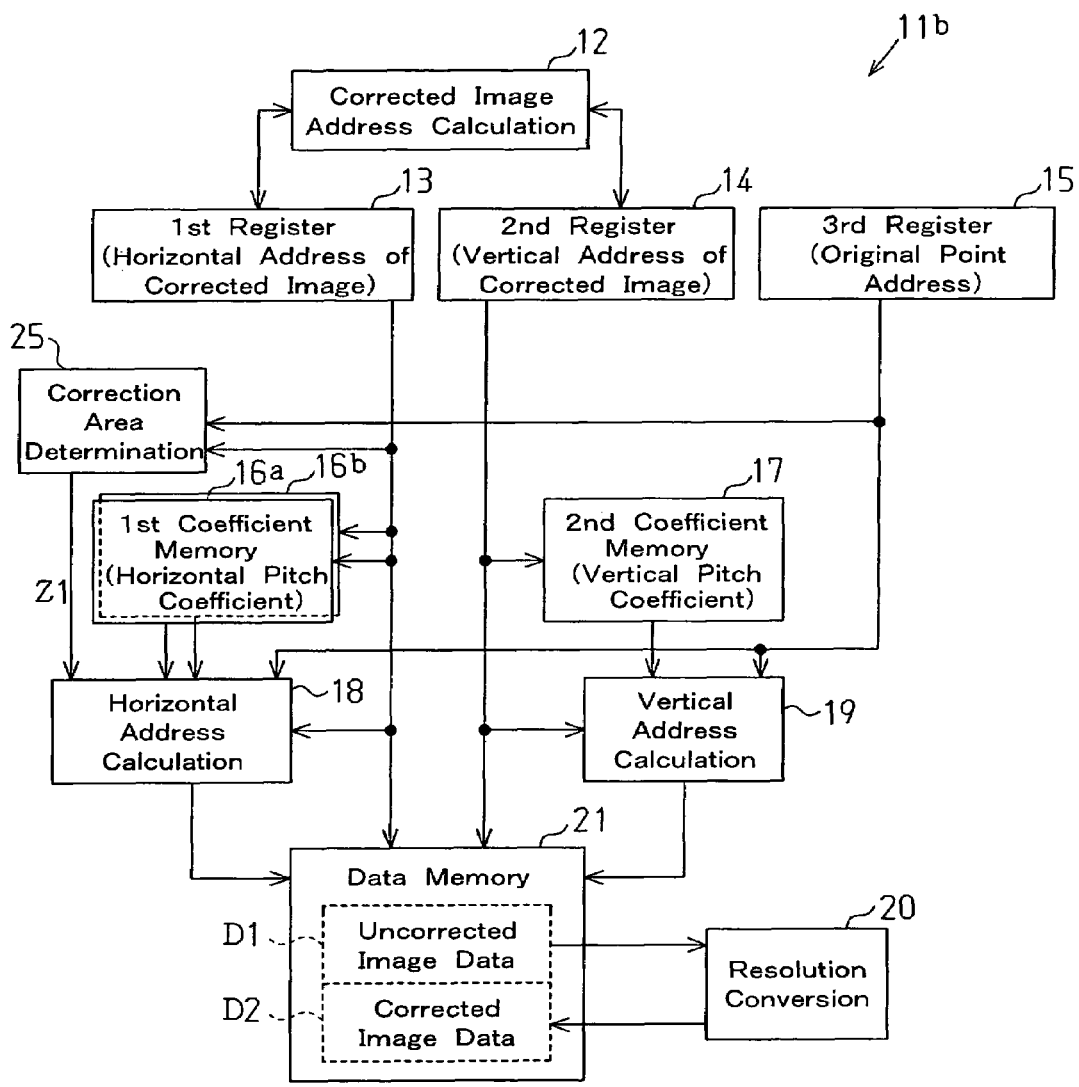
FIG. 7 is a block diagram of a distortion correction circuit according to a fifth embodiment of the present invention.
Figure 8:
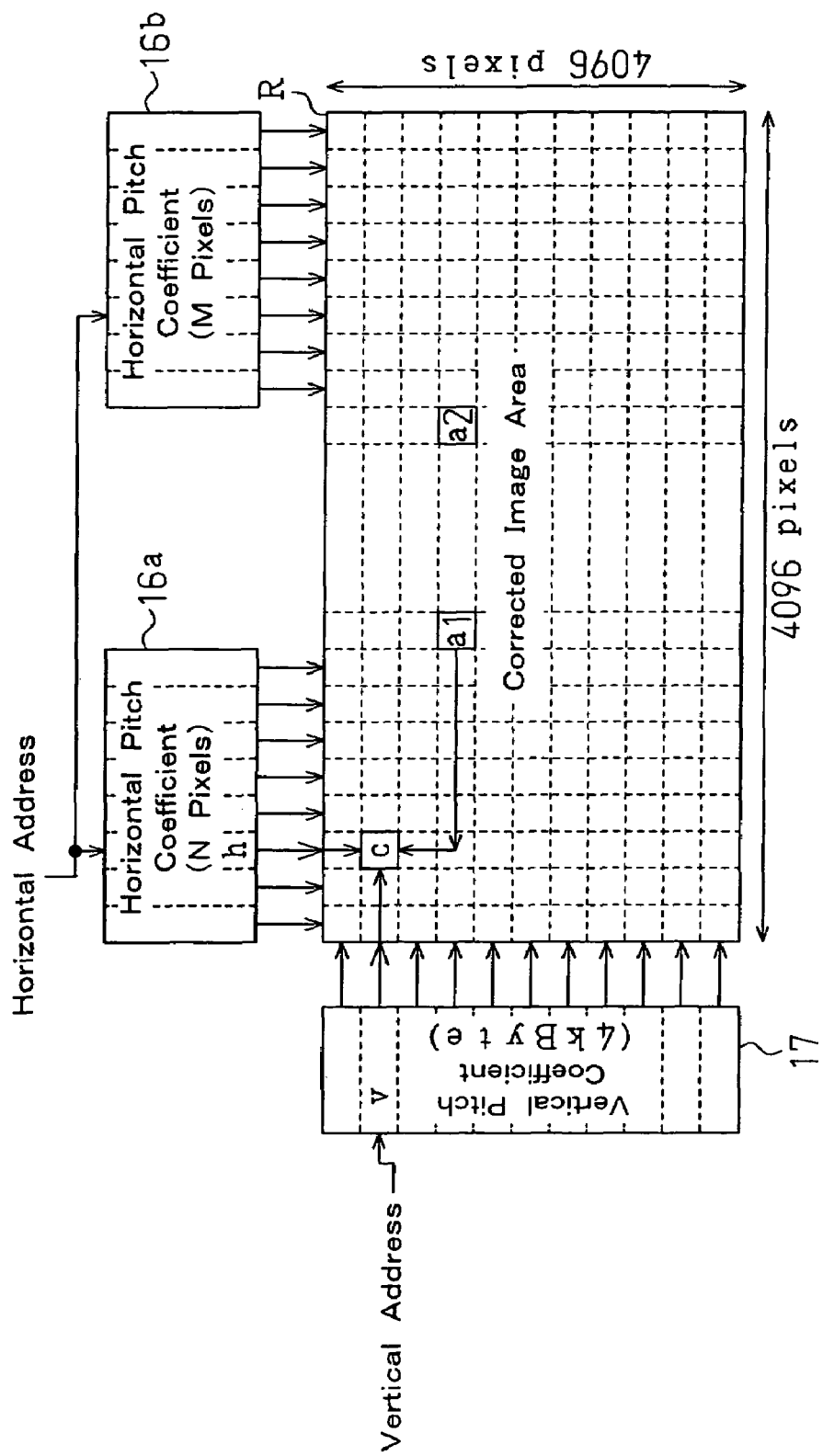
FIG. 8 is a diagram describing the correction performed in the fifth embodiment.

As shown in FIG. 7, a distortion correction circuit 11b according to the fifth embodiment includes, in addition to the components of the third embodiment, a correction area determination circuit 25. The distortion correction circuit 11b includes two first coefficient memories 16a and 16b. As shown in FIG. 8, the first coefficient memory 16a stores horizontal pitch coefficients for an N number of pixels from the leftmost pixel of the image area (the pixel with the first address on the horizontal line). The first coefficient memory 16b stores horizontal pitch coefficients for an M number of pixels from the rightmost pixel of the image area (the pixel with the final address on the horizontal line).

The third register 15 stores an address for a left original point a1 and an address for a right original point a2 in the image area R of the corrected image. In the fifth embodiment, a middle image area, which is an area having horizontal addresses between the original points a1 and a2, is an area requiring no correction (no-correction area). Horizontal pitch coefficients are not prepared for pixels included in the no-correction area.

The correction area determination circuit 25 determines whether each horizontal address is included in a correction area or in a no-correction area based on the horizontal address stored in the first register 13 and the addresses of the two original points stored in the third register 15. When the horizontal address is in a no-correction area, the correction area determination circuit 25 provides the horizontal address calculation circuit 18 with a no-correction signal Z1. The horizontal address calculation circuit 18 determines that the horizontal address stored in the first register 13 is included in a no-correction area, based on the no-correction signal Z1. In this case, the horizontal address calculation circuit 18 provides the data memory 21 with the horizontal address stored in the first register 13 as a horizontal address for the uncorrected image without performing calculation using the horizontal pitch coefficients stored in the first coefficient memories 16a and 16b. In other words, the reference position corresponding to a pixel positioned in the area between the original points a1 and a2 is the horizontal address stored in the first register 13.

The reference position of a correction pixel positioned toward the left from the original point a1 is obtained using the address of the original point stored in the third register 15, a horizontal pitch coefficient stored in the first coefficient memory 16a, and a vertical pitch coefficient stored in the second coefficient memory 17. The reference position of a correction pixel positioned toward the right from the original point a2 is obtained using the address for the original point stored in the third register 15, a horizontal pitch coefficient stored in the first coefficient memory 16b, and a vertical pitch coefficient stored in the second coefficient memory 17. The horizontal address calculation circuit 18 selects which one of the left and right original points a1 and a2 to use based on the horizontal address stored in the first register 13.

The fifth embodiment has the advantages described below.

(1) A middle portion of an image usually has little or no distortion. The distortion correction circuit 11b does not prepare horizontal pitch coefficients for the pixels of the middle portion of an image. This accordingly reduces the storage capacity of the first register 13.

(2) The distortion correction circuit 11b includes the two first coefficient memories 16a and 16b storing horizontal pitch coefficients for the right area and horizontal pitch coefficients for the left area. The right area and the left area are divided by the two original points a1 and a2. This structure enables the distortion correction circuit 11b to properly correct asymmetric distortion of an image in the horizontal direction.

Figure 9:
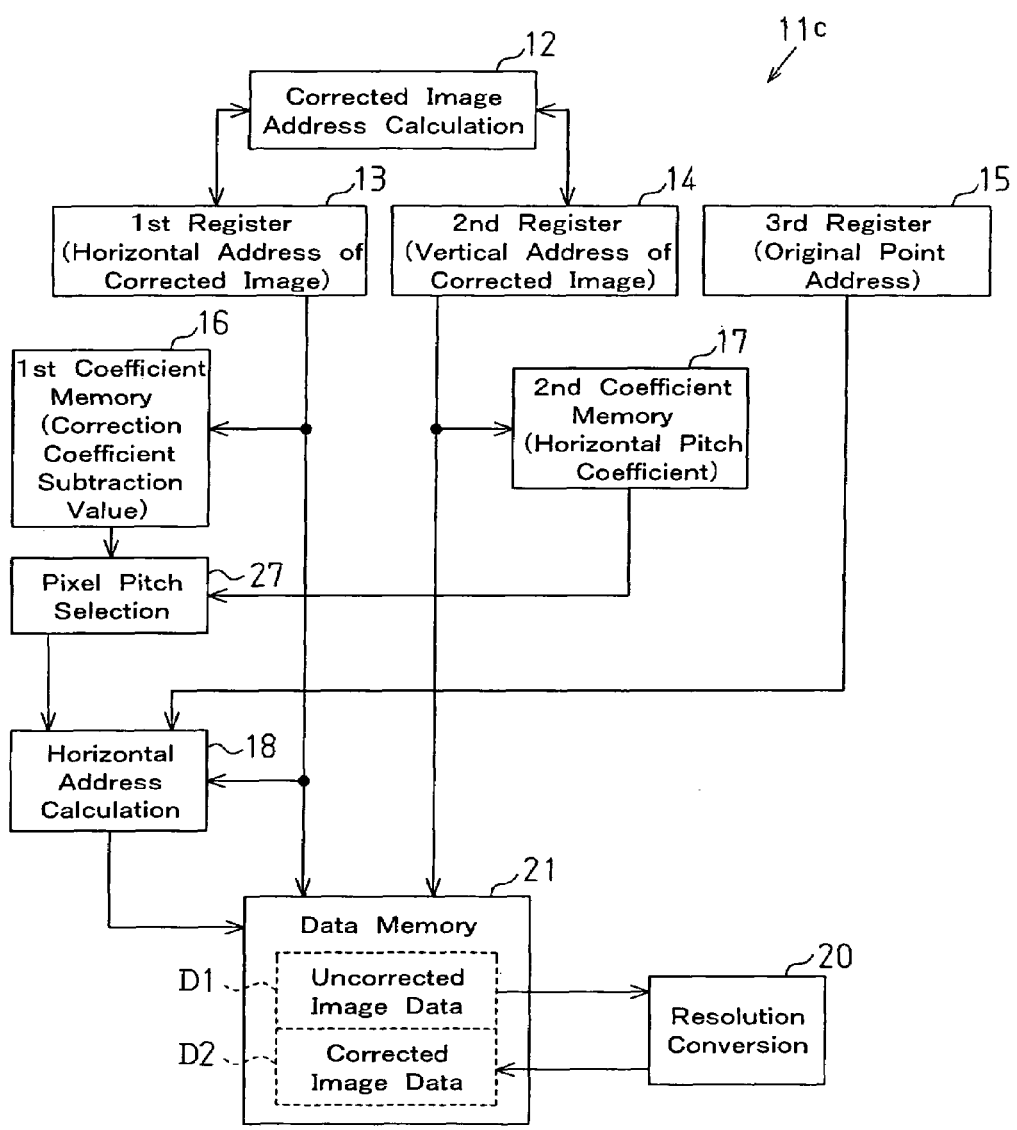
FIG. 9 is a block diagram of a distortion correction circuit according to a sixth embodiment of the present invention.

As shown in FIG. 9, a distortion correction circuit 11c according to a sixth embodiment includes, in addition to the components shown in FIG. 3, a pixel pitch selection circuit 27, but does not include the vertical address calculation circuit 19 shown in FIG. 3. The first coefficient memory 16 stores correction coefficient subtraction values (offset values of horizontal pitch coefficients) associated with horizontal addresses. The second coefficient memory 17 stores horizontal pitch coefficients associated with vertical addresses.

The distortion correction circuit 11c corrects distortion only in the horizontal direction. Also, the distortion correction circuit 11c performs no correction in the middle portion of an image and performs correction to a greater degree at locations closer to the periphery of the image.

Figure 10:
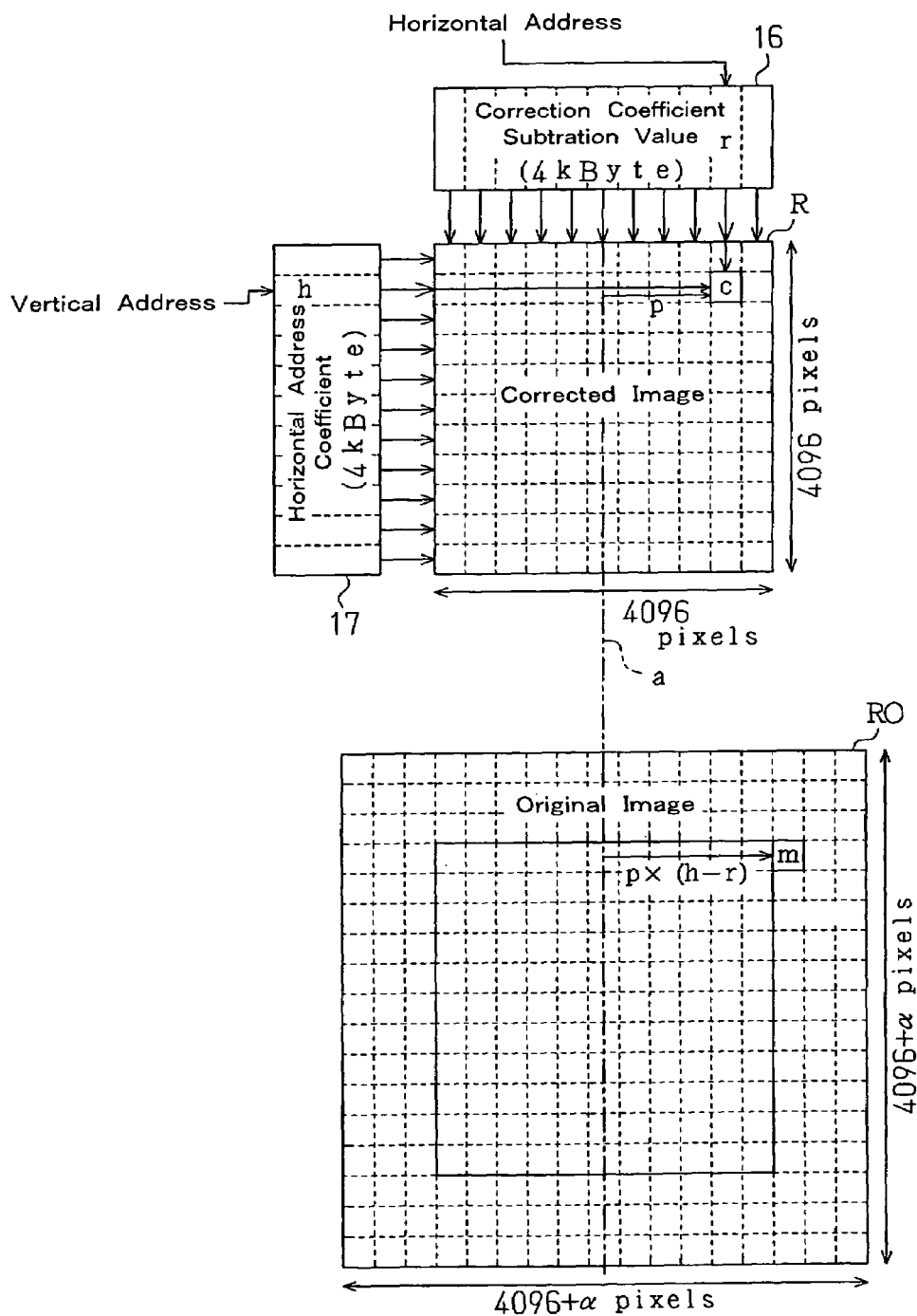
FIG. 10 is a diagram describing the correction performed in the sixth embodiment.

The following describes such distortion correction in detail, with reference to FIG. 10. The first coefficient memory 16 stores correction coefficient subtraction values r, each associated with one of the 4096 pixels arranged in the horizontal direction. The second coefficient memory 17 stores horizontal pitch coefficients, each associated with one of the 4096 pixels arranged in the vertical direction. An original point address of a vertical line (original point) a, which is a centerline drawn at the center of the image area R of the corrected image, is stored in the third register 15.

The pixel pitch selection circuit 27 reads a correction coefficient subtraction value r associated with the horizontal address stored in the first register 13 from the first coefficient memory 16, and reads a horizontal pitch coefficient h associated with the vertical address stored in the second register 14 from the second coefficient memory 17. The pixel pitch selection circuit 27 subtracts the correction coefficient subtraction value r from the horizontal pitch coefficient h. The pixel pitch selection circuit 27 sets a pixel pitch at one when the subtraction result is smaller than one (h−r<1), and sets the pixel pitch at the subtraction result (h−r) when the subtraction result is greater than or equal to one (h−r>1). The pixel pitch selection circuit 27 provides the horizontal address calculation circuit 18 with the pixel pitch. The horizontal address calculation circuit 18 calculates a horizontal address for the uncorrected image based on the pixel pitch and the original point address stored in the third register 15, and provides the data memory 21 with the calculated address.

To be more specific, the reference position m corresponding to the position c (coordinates (p, q)) of the correction pixel has a horizontal distance from the original point a as being p×(h−r) and a vertical distance from the original point a as being q in the original image. The horizontal distance is p when (h−r<1). This means that no distortion correction is performed when the subtraction result obtained by subtracting the correction coefficient subtraction value r from the horizontal pitch coefficient h is less than one (h−r<1).

Figure 11:
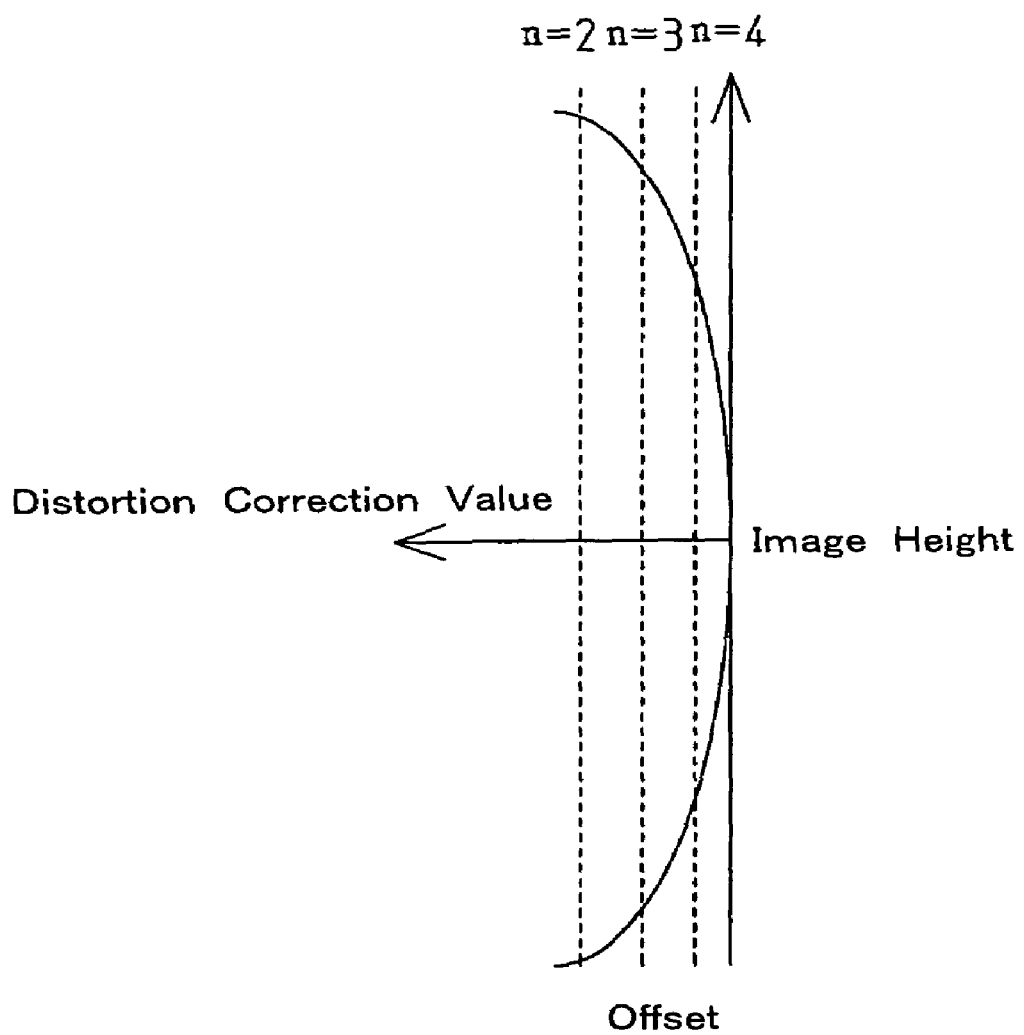
FIG. 11 is a graph showing an image height-distortion curve.

FIG. 11 shows the relationship between an image height (distance from the center of the image) and a distortion correction value. Each broken line indicates the correction coefficient subtraction value r (offset value) according to the horizontal distance n from the original point a. In the sixth embodiment, the offset value increases as the horizontal distance n decreases.

By setting the offset value in this way, no distortion correction is performed in a middle portion of the image, and distortion correction is performed to a greater degree at locations closer to the periphery of the image.

The sixth embodiment has the advantages described below.

(1) The first coefficient memory 16a, which functions as a threshold storage circuit, stores an offset value for a horizontal pitch coefficient. The pixel pitch selection circuit 27 determines whether to use the horizontal pitch coefficient based on the offset value. By using the offset value, no distortion correction is performed in the middle portion of an image in the horizontal direction and distortion correction is performed to a greater degree at locations closer to the periphery of the image. This structure enables the distortion correction circuit 11c to perform distortion correction with high precision in the horizontal direction.

Figure 12:
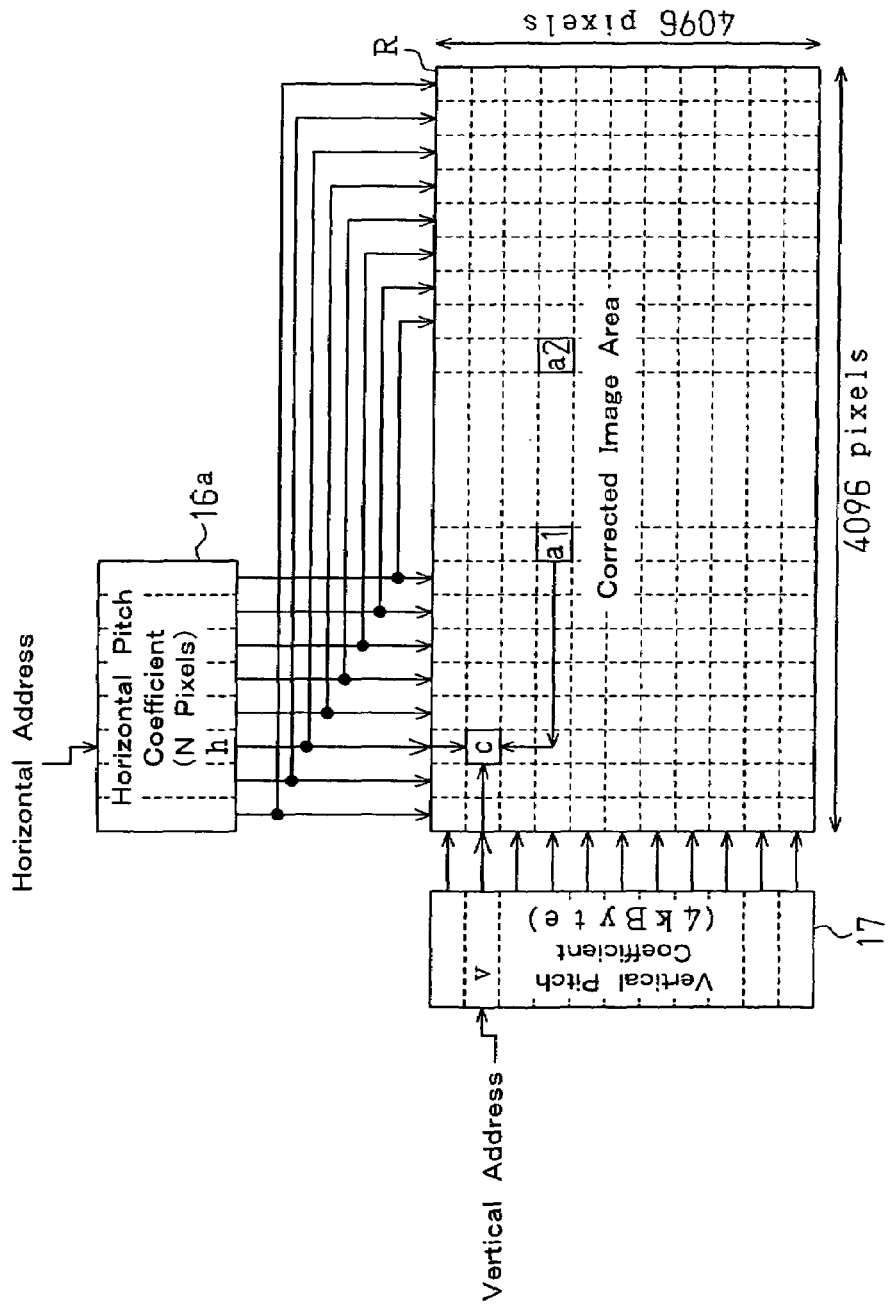
FIG. 12 is a diagram describing the correction performed in a seventh embodiment of the present invention.

The following describes a seventh embodiment of the present invention with reference to FIG. 12. In the seventh embodiment, as in the fifth embodiment, the middle portion of the image area R, that is, the area between the left and right original points a1 and a2 is a no-correction area that requires no correction. The original points a1 and a2 are horizontally symmetric to each other with respect to the centerline of the image area R (refer to line a in FIG. 10). An area toward the left of the original point a1 and an area toward the right of the original point a2 are respectively defined as a left correction area and a right correction area that require correction. Each of the correction areas has the size of an N number of pixels in the horizontal direction. The first coefficient memory 16a stores horizontal pitch coefficients for N pixels. Using the horizontal pitch coefficients, distortion correction is symmetrically performed in the left area and the right area. To be more specific, when the reference position in the original image is calculated, the same horizontal pitch coefficient is used for two pixels that are respectively included in the left and right areas and that are positioned symmetric to each other. The reference position is obtained using the address of the original point, the horizontal pitch coefficient, and the vertical pitch coefficient as in the correction process shown in FIG. 8. By using the same horizontal pitch coefficient for the two pixels respectively included in the left and right areas in this way, the distortion correction circuit according to the seventh embodiment does not need to include the first coefficient memory 16b shown in FIG. 8, and further reduces the storage capacity for storing horizontal pitch coefficients.

Figure 13:
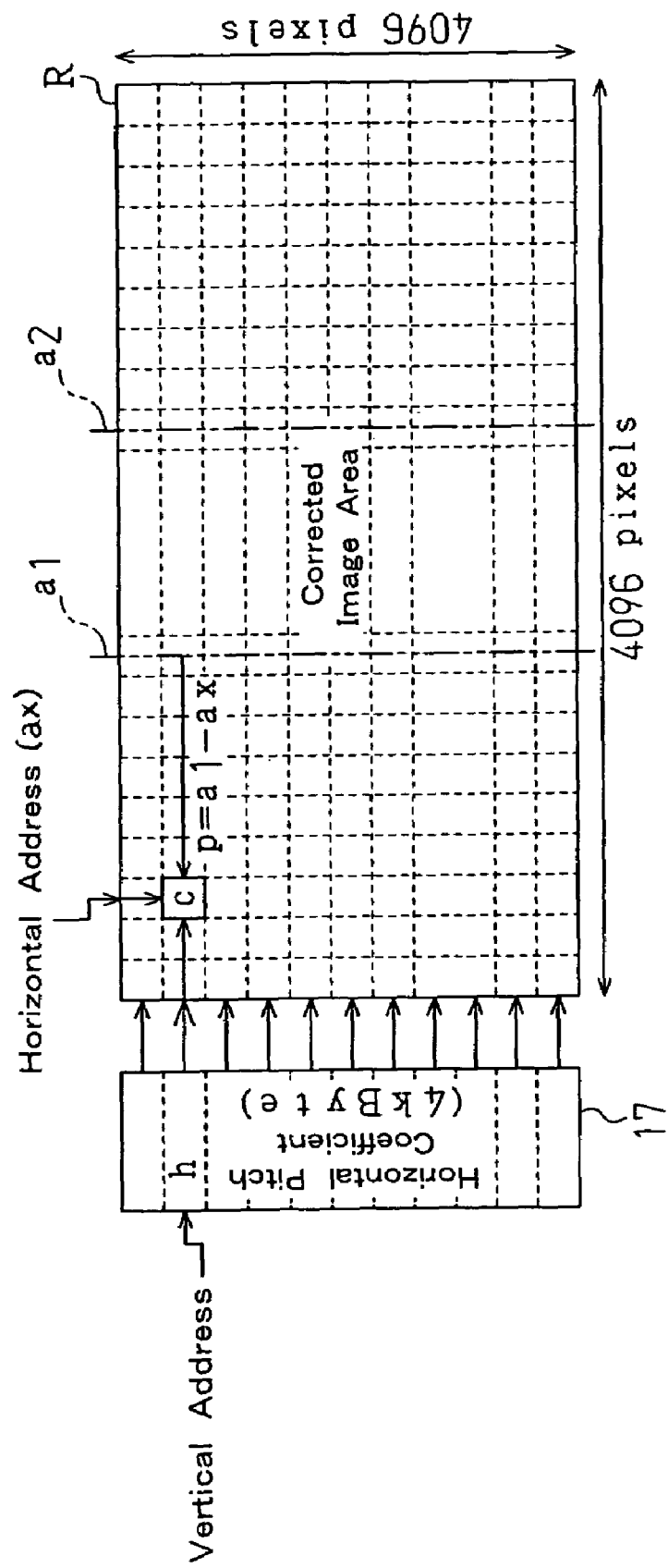
FIG. 13 is a diagram describing the correction performed in an eighth embodiment of the present invention.

The following describes an eighth embodiment of the present invention with reference to FIG. 13. In the eighth embodiment, distortion correction is performed using only horizontal pitch coefficients. Two original point lines a1 and a2 that extend vertically in the image area R are set. The left original point line a1 and the right original point line a2 may be positioned horizontally symmetric or asymmetric to each other with respect to the centerline of the image area R (refer to the line a in FIG. 10). As in the correction processes shown in FIGS. 8 and 12, an area positioned between the original points a1 and a2 is a no-correction area that requires no correction. To be more specific, the second coefficient memory 17 stores horizontal pitch coefficients for 4096 pixels arranged in the vertical direction. The reference position in the original image corresponding to each pixel of the corrected image is obtained by calculation using the distance between the original point a1 and the horizontal address ax (p=a1−ax), and the horizontal pitch coefficient h read based on the vertical address. In other words, the horizontal position of the reference position is p×h. In this case, the same horizontal pitch coefficient is used for pixels on the same horizontal line (pixels included in the correction area among the 4096 pixels). This structure is practically preferable because this structure enables distortion correction to be performed in the horizontal direction where image distortion is relatively large, and reduces the storage capacity for storing horizontal pitch coefficients.

Figure 14:
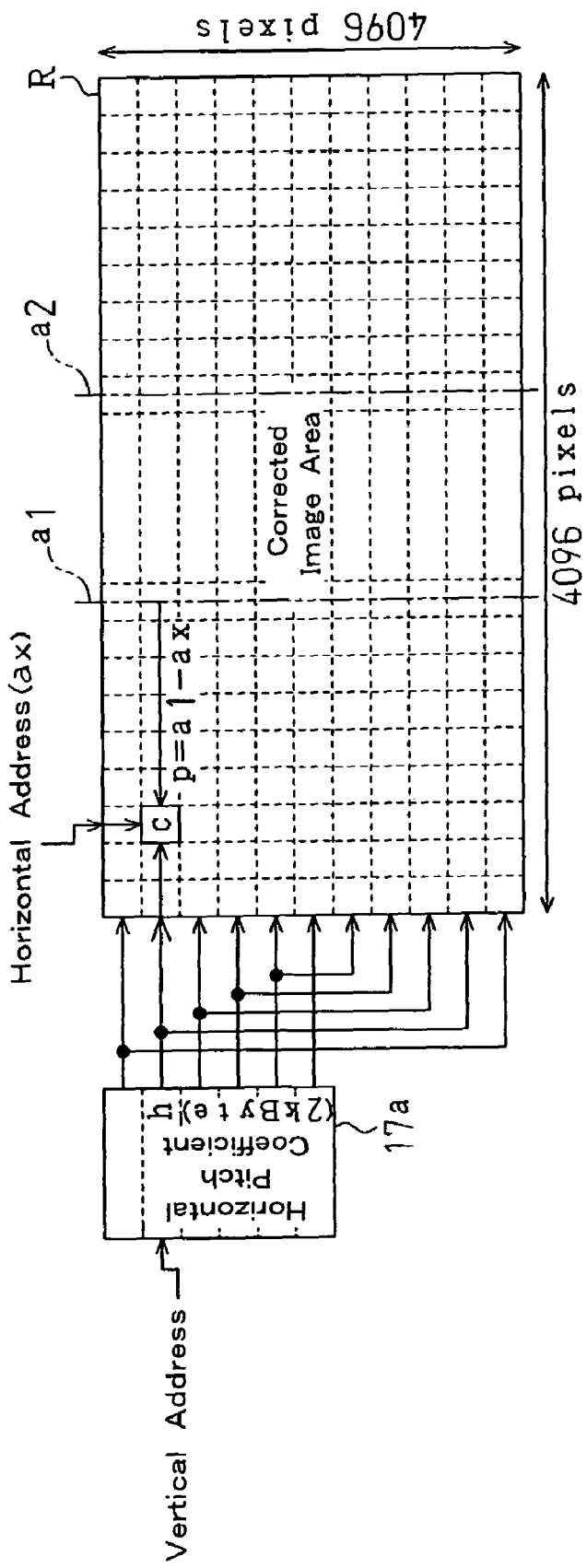
FIG. 14 is a diagram describing the correction performed in a ninth embodiment of the present invention.

The following describes a ninth embodiment of the present invention with reference to FIG. 14. In the ninth embodiment, a second coefficient memory 17a has a storage capacity (2048 bytes) that is half of the storage capacity of the second coefficient memory 17 shown in FIG. 13. The same horizontal pitch coefficient is used for pixels positioned vertically symmetric to each other in the image area R. The reference position is obtained by the same calculation as that used in the correction process shown in FIG. 13. This structure further reduces the storage capacity of the second coefficient memory 17a.

Figure 15:
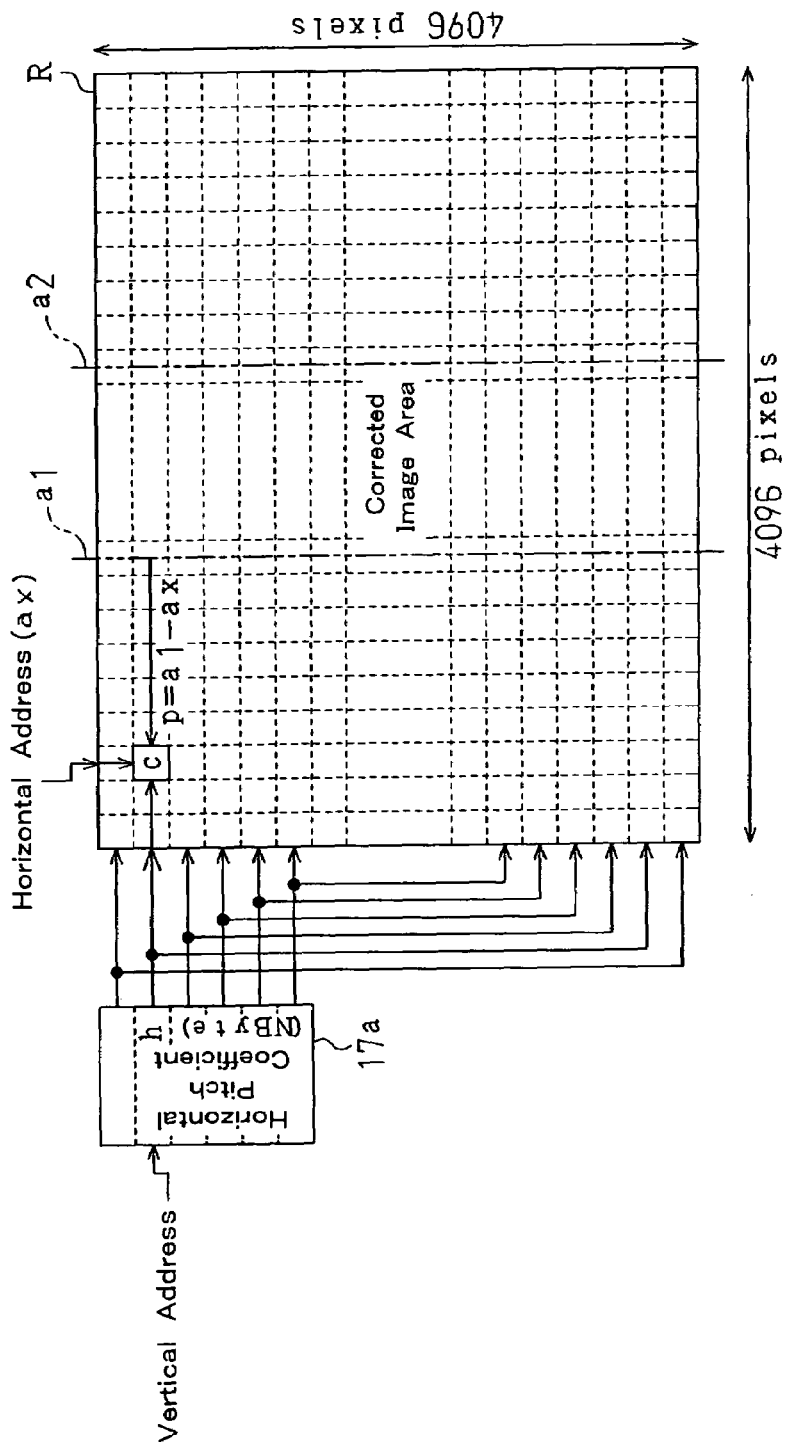
FIG. 15 is a diagram describing the correction performed in a tenth embodiment of the present invention.

The following describes a tenth embodiment of the present invention with reference to FIG. 15. In the tenth embodiment, correction is not performed in a horizontal middle portion of the image and in a vertical middle portion of the image. The second coefficient memory 17a stores horizontal pitch coefficients for N pixels, the number of which is less than half of the number of pixels in the vertical direction. The reference position is obtained by the same calculation as that used in the correction processes shown in FIGS. 13 and 14. This structure requires the second coefficient memory 17a to have only a storage capacity of N bytes, which is less than 2048 bytes, and further reduces the storage capacity of the second coefficient memory 17a.

Figure 16:
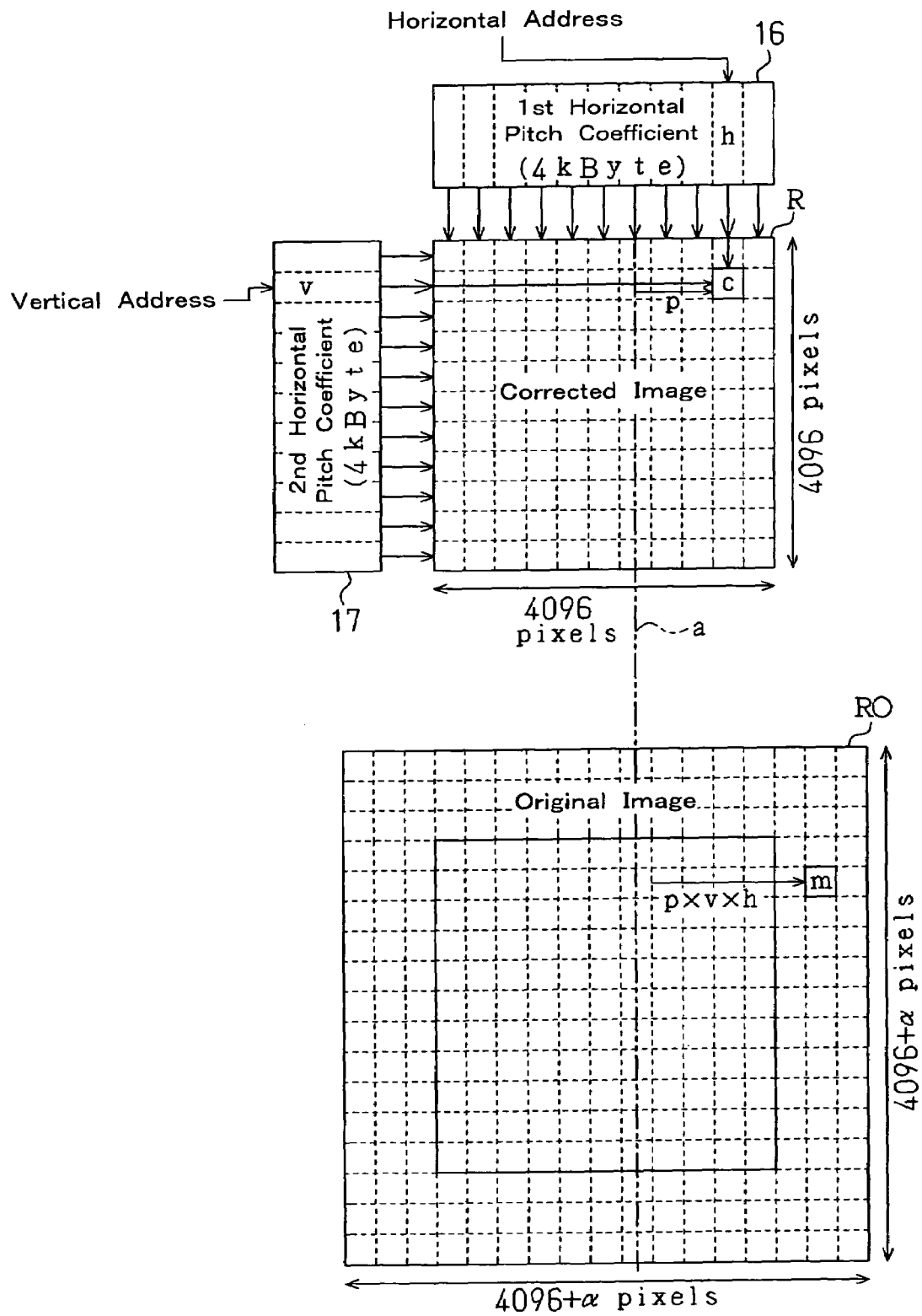
FIG. 16 is a diagram describing the correction performed in an eleventh embodiment of the present invention.

The following describes an eleventh embodiment of the present invention with reference to FIG. 16. In the eleventh embodiment, distortion correction is performed in the horizontal direction using horizontal pitch coefficients. The original point line a that extends vertically in the image area R is set. The distortion correction circuit performs distortion correction in the horizontal direction with high precision using a first horizontal pitch coefficient that is in accordance with a horizontal address and a second horizontal pitch coefficient that is in accordance with a vertical address.

To be more specific, the first coefficient memory 16 stores first horizontal pitch coefficients with 4096 bytes, each associated with one of the 4096 horizontal addresses. The second coefficient memory 17 stores second horizontal pitch coefficients with 4096 bytes, each associated with one of the 4096 vertical addresses. The horizontal position of the reference position m in the original image corresponding to the position c (coordinates (p, q)) of the corrected image is obtained by multiplying the distance p from the original point a by the first horizontal pitch coefficient h and the second horizontal pitch coefficient v (p×v×h). Since no correction is performed in the vertical direction, the vertical position of the reference position m is q.

Figure 17:
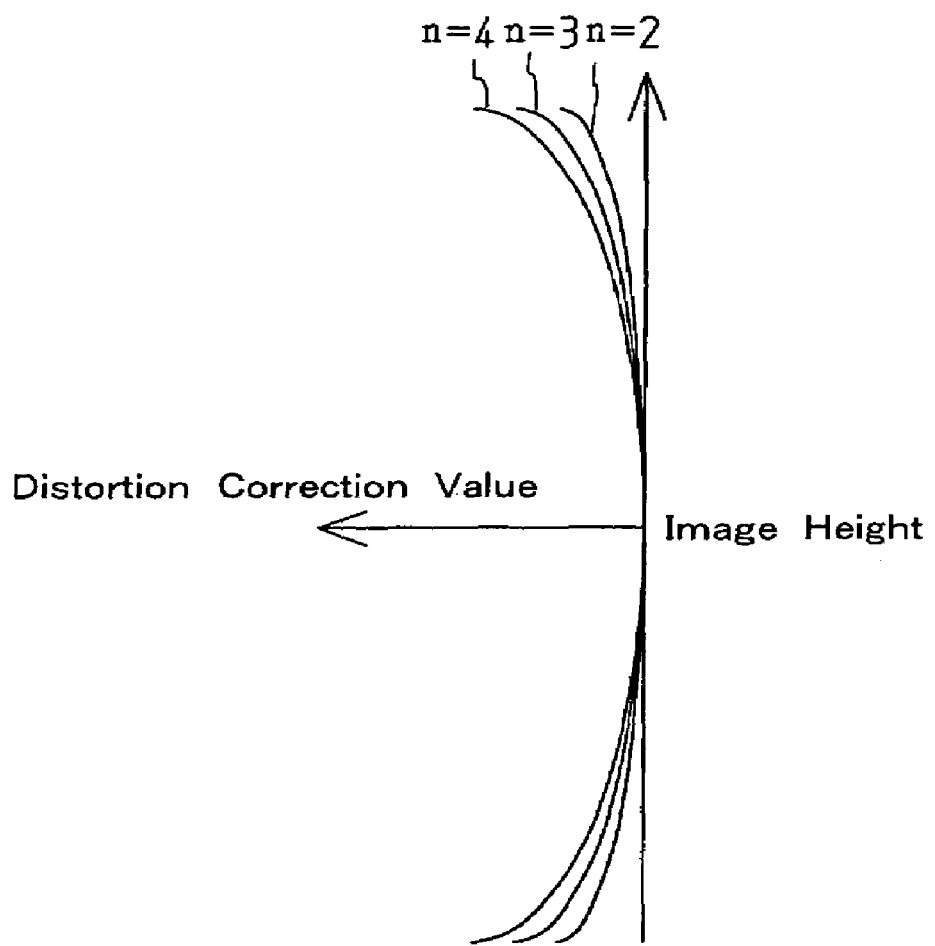
FIG. 17 is an explanatory diagram showing an image height-distortion curve according to horizontal distance.

FIG. 17 shows the relationship between an image height and a distortion correction value. In FIG. 17, n represents distance in the horizontal direction (horizontal distance) from the center of the image. The distortion correction value increases as the image height increases. The distortion correction value increases as the horizontal distance n increases. In the correction process shown in FIG. 16, the relationship between the image height and the distortion correction value may be changed according to the horizontal distance n. This enables distortion correction with high precision in the horizontal direction.

It should be apparent to those skilled in the art that the present invention may be embodied in many other specific forms without departing from the spirit or scope of the invention. Particularly, it should be understood that the present invention may be embodied in the following forms.

In the sixth embodiment, to correct pincushion distortion, the difference between the horizontal pitch coefficient h and the correction coefficient subtraction value r is set at one when the difference is less than one (h−r<1), and the correction process is executed without using the horizontal pitch coefficient h. However, the present invention is not limited to this structure. For example, to correct barrel distortion, the difference between the horizontal pitch coefficient h and the correction coefficient subtraction value r may be set at one when the difference is greater than one (h−r>1), and the correction process may be performed without using the horizontal pitch coefficient h. Also, the operational expression p×(h−r) to obtain the reference position m may be appropriately modified.

In the sixth embodiment, the first coefficient memory 16 may store two correction coefficient subtraction values (offset values) corresponding to horizontally symmetric distortion, the second coefficient memory 17 may store two horizontal pitch coefficients corresponding to vertical symmetric distortion, and one of the two coefficients stored in each coefficient memory may be selectively used. In this case, the distortion correction circuit 11c may include a switch circuit (the horizontal address conversion circuit 23 in FIG. 5) for selecting one of the two correction coefficient subtraction values, and a switch circuit (the vertical address conversion circuit 24 in FIG. 5) for selecting one of the two horizontal pitch coefficients. The horizontal address calculation circuit 18 reads the same correction coefficient subtraction value for pixels positioned horizontally symmetric to each other from the first coefficient memory 16 and reads the same horizontal pitch coefficient for pixels positioned vertically symmetric to each other from the second coefficient memory 17 to calculate the horizontal address of the uncorrected image. This structure enables each of the correction coefficient subtraction value and the horizontal pitch coefficient to be switched according to the mode selection signal Mo and enables distortion correction to be quickly changed.

The first coefficient memory 16 in FIG. 16 may store two horizontal pitch coefficients corresponding to horizontally symmetric distortion, the second coefficient memory 17 in FIG. 16 may store two horizontal pitch coefficients corresponding to vertically symmetric distortion, and one of the two coefficients stored in each coefficient memory may be selectively used. In this case, the horizontal address conversion circuit 23 and the vertical address conversion circuit 24 in FIG. 5 are used as switch circuits for selecting one of the two horizontal pitch coefficients in the coefficient memories. The horizontal address calculation circuit 18 reads the same horizontal pitch coefficient for pixels positioned horizontally symmetric to each other from the first coefficient memory 16 and reads the same horizontal pitch coefficient for pixels vertically symmetric to each other from the second coefficient memory 17 to calculate the horizontal address of the uncorrected image. This structure also enables distortion correction to be quickly changed.

In the correction processes shown in FIG. 10 and FIGS. 13 to 16, distortion is corrected only in the horizontal direction. However, the present invention is not limited to such a process. The correction process may be appropriately modified according to the shape of the imaging device of the digital camera. For example, when the imaging device of the digital camera has a rectangular shape that is longer in the vertical direction, image distortion becomes greater in the vertical direction compared with when the imaging device has a rectangular shape that is longer in the horizontal direction. In this case, the correction process may be modified to perform distortion correction only in the vertical direction. To be more specific, each of the coefficient memories 16 and 17 may store vertical pitch coefficients, and the correction process may be performed using the vertical pitch coefficients.

The address calculation circuits 12, 18, and 19, the resolution conversion circuit 20, the address conversion circuits 23 and 24, the correction area determination circuit 25, and the pixel pitch selection circuit 27 may be separate circuits, or may be one or more processing devices such as CPUs for executing programs that realize processing of each of these circuits.

The present examples and embodiments are to be considered as illustrative and not restrictive, and the invention is not to be limited to the details given herein, but may be modified within the scope and equivalence of the appended claims.

What is claimed is:

1. A distortion correction circuit for generating a corrected image using data for an uncorrected image, the corrected image being an image for which distortion has been corrected and that includes a plurality of pixels, the distortion correction circuit comprising:

an address generation circuit for generating a horizontal address and a vertical address for each of the plurality of pixels of the corrected image;

a correction coefficient storage circuit for storing a pixel pitch correction coefficient associated with at least one of the horizontal address and the vertical address of each pixel of the corrected image;

a first image storage circuit for storing data for the uncorrected image;

an address calculation circuit, connected to the address generation circuit, the correction coefficient storage circuit, and the first image storage circuit, for calculating an address for data for the uncorrected image corresponding to each pixel using the horizontal address and the vertical address of each pixel and the pixel pitch correction coefficient associated with at least one of the horizontal address and the vertical address of each pixel;

a data processing circuit, connected to the first image storage circuit, for reading the data for the uncorrected image stored at the address calculated by the address calculation circuit from the first image storage circuit and for generating image data for the corrected image; and a second image storage circuit, connected to the data processing circuit, for storing the image data for the corrected image, wherein:

the pixel pitch correction coefficient includes a plurality of horizontal pitch coefficients, each associated with one of the horizontal addresses, and a plurality of vertical pitch coefficients, each associated with the vertical address of each pixel;

the correction coefficient storage circuit includes a first coefficient memory for storing a plurality of horizontal pitch coefficients and a second coefficient memory for storing a plurality of vertical pitch coefficients; and the address calculation circuit calculates a horizontal address for the data for the uncorrected image corresponding to each pixel based on the horizontal address of the pixel and the associated address of each pixel, and calculates a vertical address for the data for the uncorrected image corresponding to each pixel based on the vertical address of the pixel and the associated vertical pitch coefficient.

2. The distortion correction circuit according to claim 1, wherein the first coefficient memory stores two horizontal pitch coefficients for correcting horizontally symmetric distortion, and the second coefficient memory stores two vertical pitch coefficients for correcting vertically symmetric distortion, the distortion correction circuit further comprising:

a switch circuit for selecting one of the two pitch coefficients stored in each of the first and second coefficient memories.

3. The distortion correction circuit according to claim 1, further comprising:

an original point storage circuit for storing an original point address representing a position of an original point on the corrected image;

wherein the address calculation circuit calculates a horizontal distance between the original point and each pixel using a difference between the original point address and the horizontal address of each pixel, calculates the horizontal address of the data of the uncorrected image corresponding to each pixel by multiplying the horizontal distance calculated for the pixel by the associated horizontal pitch coefficient, calculates a vertical distance between the original point and each pixel using a difference between the original point address and the vertical address of each pixel, and calculates the vertical address for the data for the uncorrected image corresponding to each pixel by multiplying the vertical distance calculated for the pixel by the associated vertical pitch coefficient.

4. The distortion correction circuit according to claim 3, wherein:
the corrected image includes a left area and a right area that are divided at a center of the corrected image in a horizontal direction;
the original point address includes a left original point address set for the left area and a right original point address set for the right area; and
the address calculation circuit calculates a horizontal address for the data for the uncorrected image corresponding to the left area using the left original point address and the horizontal pitch coefficient for each pixel included in the left area, and calculates a horizontal address for the data for the uncorrected image corresponding to the right area using the right original point address and the horizontal pitch coefficient for each pixel included in the right area.

5. The distortion correction circuit according to claim 3, wherein:
the corrected image includes a left area and a right area that are divided by a centerline drawn at a horizontal center of the corrected image, the original point is one of a left original point set for the left area and a right original point set for the right area, and the left original point and the right original point are symmetric in the corrected image with respect to the centerline;
the first coefficient memory stores a horizontal pitch coefficient commonly associated with pixels that are symmetric with respect to the centerline; and
the address calculation circuit reads the common horizontal pitch coefficient from the first coefficient memory, and calculates a horizontal address for data for the uncorrected image corresponding to each of the pixels that are symmetric with respect to the centerline using the common horizontal pitch coefficient.

6. The distortion correction circuit according to claim 1, wherein the distortion correction circuit is used for an imaging device including an optical system and corrects distortion caused by the optical system.

7. A distortion correction circuit for generating a corrected image using data for an uncorrected image, the corrected image being an image for which distortion has been corrected and that includes a plurality of pixels, the distortion correction circuit comprising:
an address generation circuit for generating a horizontal address and a vertical address for each of the plurality of pixels of the corrected image;
a correction coefficient storage circuit for storing a pixel pitch correction coefficient associated with at least one of the horizontal address and the vertical address of each pixel of the corrected image;
a first image storage circuit for storing data for the uncorrected image;
an address calculation circuit, connected to the address generation circuit, the correction coefficient storage circuit, and the first image storage circuit, for calculating an address for data for the uncorrected image corresponding to each pixel using the horizontal address and the vertical address of each pixel and the pixel pitch correction coefficient associated with at least one of the horizontal address and the vertical address of each pixel;
a data processing circuit, connected to the first image storage circuit, for reading the data for the uncorrected image stored at the address calculated by the address calculation circuit from the first image storage circuit and for generating image data for the corrected image;
a second image storage circuit, connected to the data processing circuit, for storing the image data for the corrected image; and
an original point storage circuit for storing an original point address representing a position of an original point on the corrected image;
wherein the correction coefficient storage circuit stores a plurality of first horizontal pitch coefficients, each associated with one of the horizontal addresses of the plurality of pixels, and a plurality of second horizontal pitch coefficients, each associated with one of the vertical addresses of the plurality of pixels; and
the address calculation circuit calculates a horizontal distance between the original point and each pixel using a difference between the original point address and the horizontal address of each pixel, and calculates the horizontal address of the data of the uncorrected image corresponding to each pixel by multiplying the horizontal distance calculated for the pixel by the associated first and second horizontal pitch coefficients stored in the correction coefficient storage circuit.

8. The distortion correction circuit according to claim 7, wherein:
the corrected image includes a left area and a right area that are divided at a center of the corrected image in a horizontal direction;
the original point address includes a left original point address set for the left area and a right original point address set for the right area; and
the address calculation circuit calculates a horizontal address for the data for the uncorrected image corresponding to the left area using the left original point address and the horizontal pitch coefficient for each pixel included in the left area, and calculates a horizontal address for the data for the uncorrected image corresponding to the right area using the right original point address and the horizontal pitch coefficient for each pixel included in the right area.

9. The distortion correction circuit according to claim 7, wherein:
the corrected image includes a left area and a right area that are divided by a centerline drawn at a horizontal center of the corrected image, the original point is one of a left original point set for the left area and a right original point set for the right area, and the left original point and the right original point are symmetric in the corrected image with respect to the centerline;
the first coefficient memory stores a horizontal pitch coefficient commonly associated with pixels that are symmetric with respect to the centerline; and
the address calculation circuit reads the common horizontal pitch coefficient from the first coefficient memory, and calculates a horizontal address for data for the uncorrected image corresponding to each of the pixels that are symmetric with respect to the centerline using the common horizontal pitch coefficient.

10. A distortion correction circuit for generating a corrected image using data for an uncorrected image, the corrected image being an image for which distortion has been corrected and that includes a plurality of pixels, the distortion correction circuit comprising:

an address generation circuit for generating a horizontal address and a vertical address for each of the plurality of pixels of the corrected image;

a correction coefficient storage circuit for storing a pixel pitch correction coefficient associated with at least one of the horizontal address and the vertical address of each pixel of the corrected image;

a first image storage circuit for storing data for the uncorrected image;

an address calculation circuit, connected to the address generation circuit, the correction coefficient storage circuit, and the first image storage circuit, for calculating an address for data for the uncorrected image corresponding corresponding to each pixel using the horizontal address and the vertical address of each pixel and the pixel pitch correction coefficient associated with at least one of the horizontal address and the vertical address of each pixel;

a data processing circuit, connected to the first image storage circuit, for reading the data for the uncorrected image stored at the address calculated by the address calculation circuit from the first image storage circuit and for generating image data for the corrected image;

a second image storage circuit, connected to the data processing circuit, for storing the image data for the corrected image; and an original point storage circuit for storing an original point address representing a position of an original point on the corrected image;

wherein the correction coefficient storage circuit includes a coefficient memory storing a plurality of horizontal pitch coefficients, each associated with one of the vertical addresses of the plurality of pixels; and the address calculation circuit calculates a horizontal distance between the original point and each pixel using a difference between the original point address and the horizontal address of each pixel, and calculates the horizontal address for the data for the uncorrected image corresponding to each pixel by multiplying the horizontal distance calculated for the pixel by the associated horizontal pitch coefficient stored in the coefficient memory.

11. The distortion correction circuit according to claim 10, wherein:

the corrected image includes an upper area and a lower area that are divided by a centerline drawn at a vertical center of the corrected image;

the coefficient memory stores a horizontal pitch coefficient commonly associated with pixels that are symmetric with respect to the centerline; and the address calculation circuit reads the common horizontal pitch coefficient from the coefficient memory, and calculates a horizontal address for data for the uncorrected image corresponding to each of the two pixels that are symmetric with respect to the centerline using the common horizontal pitch coefficient.

12. A distortion correction circuit for generating a corrected image using data for an uncorrected image, the corrected image being an image for which distortion has been corrected and that includes a plurality of pixels, the distortion correction circuit comprising:

an address generation circuit for generating a horizontal address and a vertical address for each of the plurality of pixels of the corrected image;

a correction coefficient storage circuit for storing a pixel pitch correction coefficient associated with at least one of the horizontal address and the vertical address of each pixel of the corrected image;

a first image storage circuit for storing data for the uncorrected image;

an address calculation circuit, connected to the address generation circuit, the correction coefficient storage circuit, and the first image storage circuit, for calculating an address for data for the uncorrected image corresponding to each pixel using the horizontal address and the vertical address of each pixel and the pixel pitch correction coefficient associated with at least one of the horizontal address and the vertical address of each pixel;

a data processing circuit, connected to the first image storage circuit, for reading the data for the uncorrected image stored at the address calculated by the address calculation circuit from the first image storage circuit and for generating image data for the corrected image; and a second image storage circuit, connected to the data processing circuit, for storing the image data for the corrected image;

wherein the address calculation circuit uses a horizontal address and a vertical address for a pixel for which its address is determined to be in an area that requires no correction as a calculation result of the address for data for the uncorrected image corresponding to the pixel.

13. The distortion correction circuit according to claim 12, further comprising:

a correction area determination circuit, connected to the address calculation circuit, for determining whether an address of each pixel is in the area that requires correction or in an area that requires no correction.

14. The distortion correction circuit according to claim 13, wherein the area that requires no correction is at least one of a middle portion of the corrected image in a horizontal direction and a middle portion of the corrected image in a vertical direction.

15. A distortion correction circuit for generating a corrected image using data for an uncorrected image, the corrected image being an image for which distortion has been corrected and that includes a plurality of pixels, the distortion correction circuit comprising:

an address generation circuit for generating a horizontal address and a vertical address for each of the plurality of pixels of the corrected image;

a correction coefficient storage circuit for storing a pixel pitch correction coefficient associated with at least one of the horizontal address and the vertical address of each pixel of the corrected image;

a first image storage circuit for storing data for the uncorrected image;

an address calculation circuit, connected to the address generation circuit, the correction coefficient storage circuit, and the first image storage circuit, for calculating an address for data for the uncorrected image corresponding to each pixel using the horizontal address and the vertical address of each pixel and the pixel pitch correction coefficient associated with at least one of the horizontal address and the vertical address of each pixel;

a data processing circuit, connected to the first image storage circuit, for reading the data for the uncorrected image stored at the address calculated by the address calculation circuit from the first image storage circuit and for generating image data for the corrected image;

a second image storage circuit, connected to the data processing circuit, for storing the image data for the corrected image; and a threshold storage circuit, connected to the address generation circuit, for storing an offset value of the pixel pitch correction coefficient for each pixel, wherein the offset value is set according to an address of each pixel; and a correction coefficient selection circuit, connected to the threshold storage circuit, for determining whether to use the pixel pitch correction coefficient for each pixel stored in the correction coefficient storage circuit based on the associated offset value.

16. The distortion correction circuit according to claim 15, wherein:

the corrected image includes a left area and a right area that are divided by a first centerline drawn at a horizontal center of the corrected image, and an upper area and a lower area that are divided by a second centerline drawn at a vertical center of the corrected image;

the threshold storage circuit is a first coefficient memory for storing an offset value of the pixel pitch correction coefficient associated with the horizontal address of each pixel, wherein one offset value is commonly associated with horizontal addresses of pixels that are symmetric with respect to the first centerline;

the correction coefficient storage circuit is a second coefficient memory for storing a horizontal pitch coefficient that is associated with the vertical address of each pixel, wherein one horizontal pitch coefficient is commonly associated with vertical addresses of pixels that are symmetric with respect to the second centerline; and the address calculation circuit reads the offset value common to the pixels that are symmetric with respect to the first centerline from the first coefficient memory and reads the horizontal pitch coefficient common to the pixels that are symmetric with respect to the second centerline from the second coefficient memory to calculate a horizontal address for data for the uncorrected image corresponding to each of the pixels.

17. The distortion correction circuit according to claim 16, wherein the first coefficient memory stores two offset values for correcting distortion symmetric with respect to the first centerline, and the second coefficient memory stores two horizontal pitch coefficients for correcting distortion symmetric with respect to the second centerline, the distortion correction circuit further comprising:

a switch circuit for selecting one of the two offset values stored in the first coefficient memory and one of the two horizontal pitch coefficients stored in the second coefficient memory.

18. A distortion correction circuit for an imaging device including an optical system with a distortion characteristic, wherein the distortion correction circuit processes data for an uncorrected image formed by the optical system to generate a corrected image for which distortion has been corrected, the uncorrected image includes a plurality of first pixels that form a plurality of lines and a plurality of columns, and the corrected image includes a plurality of second pixels that form a plurality of lines and a plurality of columns, the distortion correction circuit comprising:

an address generation circuit for generating a line address and a column address for each of the plurality of second pixels;

a correction coefficient storage circuit for storing a pixel pitch correction coefficient that is predetermined in accordance with the distortion characteristic in association with at least one of the line address and the column address for each second pixel;

a first image storage circuit for storing data for the uncorrected image in association with a line address and a column address for each of the plurality of first pixels;

an address calculation circuit, connected to the address generation circuit, the correction coefficient storage circuit, and the first image storage circuit, for calculating a line address and a column address for a first pixel corresponding to each second pixel using the line address and the column address of the second pixel and the pixel pitch correction coefficient associated with the second pixel;

a data processing circuit, connected to the first image storage circuit, for generating image data for the corrected image by referring to data for each first pixel specified by the calculated line address and the column address of the first pixel;

a second image storage circuit, connected to the data processing circuit, for storing the image data for the corrected image; and an original point storage circuit for storing an original point address representing a position of an original point on the corrected image;

wherein the correction coefficient storage circuit stores a plurality of first horizontal pitch coefficients, each associated with one of the horizontal addresses of the plurality of second pixels, and a plurality of second horizontal pitch coefficients, each associated with one of the vertical addresses of the plurality of second pixels; and the address calculation circuit calculates a horizontal distance between the original point and each second pixel using a difference between the original point address and the horizontal address of the second pixel, and calculates a horizontal address of a first pixel corresponding to each second pixel by multiplying the horizontal distance calculated for the second pixel by the associated first and second horizontal pitch coefficients.

19. A distortion correction circuit for an imaging device including an optical system with a distortion characteristic, wherein the distortion correction circuit processes data for an uncorrected image formed by the optical system to generate a corrected image for which distortion has been corrected, the uncorrected image includes a plurality of first pixels that form a plurality of lines and a plurality of columns, and the corrected image includes a plurality of second pixels that form a plurality of lines and a plurality of columns, the distortion correction circuit comprising:

an address generation circuit for generating a line address and a column address for each of the plurality of second pixels;

a correction coefficient storage circuit for storing a pixel pitch correction coefficient that is predetermined in accordance with the distortion characteristic in association with at least one of the line address and the column address for each second pixel;

a first image storage circuit for storing data for the uncorrected image in association with a line address and a column address for each of the plurality of first pixels;

an address calculation circuit, connected to the address generation circuit, the correction coefficient storage circuit, and the first image storage circuit, for calculating a line address and a column address for a first pixel corresponding to each second pixel using the line address and the column address of the second pixel and the pixel pitch correction coefficient associated with the second pixel;

a data processing circuit, connected to the first image storage circuit, for generating image data for the corrected image by referring to data for each first pixel specified by the calculated line address and the column address of the first pixel;

a second image storage circuit, connected to the data processing circuit, for storing the image data for the corrected image; and a correction area determination circuit, connected to the address calculation circuit, for determining whether the address of each second pixel is in an area that requires correction or in an area that requires no correction, wherein, for a second pixel in the area that requires no correction, the data processing circuit refers to data of a first pixel having the same horizontal and vertical addresses as the second pixel.

* * * * *